TELEPHONE SWITCHING SYSTEM

Filed May 16, 1962

13 Sheets-Sheet 1

INVENTORS R. C. GEBHARDT
W. L. SHAFER, JR.
A. E. SPENCER, JR.
W. N. TOY
F. S. VIGLIANTE
R. D. WILLIAMS
O. H. WILLIFORD

BY John C Albrecht
ATTORNEY

Dec. 21, 1965 R. C. GEBHARDT ETAL 3,225,144

TELEPHONE SWITCHING SYSTEM

Filed May 16, 1962 13 Sheets-Sheet 4

Dec. 21, 1965 R. C. GEBHARDT ETAL 3,225,144

TELEPHONE SWITCHING SYSTEM

Filed May 16, 1962 13 Sheets-Sheet 5

Dec. 21, 1965 R. C. GEBHARDT ET AL 3,225,144

TELEPHONE SWITCHING SYSTEM

Filed May 16, 1962 13 Sheets-Sheet 13

United States Patent Office 3,225,144

Patented Dec. 21, 1965

3,225,144

TELEPHONE SWITCHING SYSTEM

Robert C. Gebhardt, Parsippany, William L. Shafer, Jr., Short Hills, Albert E. Spencer, Jr., Livingston, Wing N. Toy, Berkeley Heights, Frank S. Vigliante, Piscataway Township, Middlesex County, and Robert D. Williams, Middletown, N.J., and Oscar H. Williford, Bronxville, N.Y., assignors to Bell Telephone Laboratories, Incorporated, New York, N.Y., a corporation of New York Filed May 16, 1962, Ser. No. 195,199
45 Claims. (Cl. 179—27)

This invention relates in general to telephone switching systems and, more particularly, to an electronic private branch exchange system.

Voice and data communication play extremely large roles in modern business and in many instances private branch telephone exchanges are provided to permit communication between employees at a given company location, between employees at different company locations, and between employees and telephones served by the general public telephone switching network. Private branch exchanges are generally small telephone switching systems which are designed to serve a relatively small number of extensions. There are many successful types of private branch exchanges such as crossbar, step-by-step, all relay, et cetera. In a majority of installations the private branch exchange is a self contained entity which is located at the subscriber's premises; however, there are recent arrangements wherein a centrally located switching center serves a number of company subscriber groups and therefore provides centralized PBX service.

Electronic private branch exchanges in which the entire exchange equipment, including switching network and control circuitry, is discrete to a particular subscriber fails to take advantage of the inherent capabilities of electronic control circuitry. That is, in a common control private branch exchange the control apparatus, which must be complex to meet the modern requirements of a private branch exchange, is not used to its full capacity while serving a single small private branch exchange subscriber group. Therefore, it is difficult for an electronic private branch exchange serving a small subscriber group to compete on an economic basis with prior art systems. Centralized PBX operation, whether prior art electromechanical systems or modern electronic systems are employed, has many advantages over small exchanges located on customers' premises. However, there is a great community of interest between employees of a company, and the greatest communication requirement of a private branch exchange is the need for communications between extensions of the system. With these facts in mind there are obvious advantages to locating the switching network at the subscriber's premises as the majority of calls will originate and terminate within the PBX. For example, there are great savings in cable pairs when the private branch exchange switching network is located on the subscriber's premises.

The same situation, however, does not obtain with respect to the common equipment as it is possible and advantageous to locate complex common electronic equipment at a central point from which a number of private branch exchanges may be served. The inherent high speed characteristics of the common control equipment are thereby fully utilized.

It is an object of this invention to provide an improved private branch exchange switching system wherein the inherent capabilities of electronic control apparatus are fully utilized.

It is an object of this invention to minimize the equipment installed on the premises of a private branch exchange customer.

It is another object of this invention to minimize the cost and effort required to administer changes in traffic handling capacity and services afforded a private branch exchange customer.

It is another object of this invention to increase the flexibility of private branch exchange telephone systems and to thereby rovide new and specialized services.

It is another object of this invention to improve the reliability of time division switching networks.

These and other objects of this invention are achieved in one specific illustrative embodiment wherein a centrally located control unit is arranged to control a number of private branch exchange switching units which are located at or near the subscriber's premises.

The private branch exchange switching unit comprises a pulse amplitude modulation time division switching network having a plurality of time division links. The switching unit serves a maximum of two hundred extensions, a maximum of thirty-five central office and tie trunks, a maximum of three attendant switchboard consoles, and accessory services such as recorded dictation, announcements, et cetera. The switching unit is connected to the control unit by three types of transmission facilities. The first type of transmission facility provides transmission trunks to the general public telephone switching network, and tie trunks to other company locations. The second type of transmission facility provides signaling trunks for transmitting call signaling information, i.e., tone signaling information, from the subscriber's station to register equipment located in the control unit. The third type of transmission facility comprises a first unidirectional data trunk for transmitting supervisory information from the switching unit to the control unit and a second unidirectional data trunk for transmitting control data from the control unit to the switching unit.

The switching unit includes a scanning circuit for determining the supervisory state of the extensions, the circuits of the attendants' consoles, and the central office and tie trunks. A record of the supervisory state of lines, trunks, and the attendant's console circuits is maintained at the switching unit and advantageously supervisory information is transmitted to the control unit only after a change in supervisory state has occurred. A supervisory data message from the switching unit to the control unit comprises the address of the line, trunk or attendant's console circuit which has changed supervisory state and an indication of the present state, i.e., on-hook or off-hook.

The control data transmitted from the control unit to the switching unit comprises orders to the switching unit setting forth connections to be established or disestablished, information for the control of signaling lights at the attendants' consoles, and signals associated with switch unit maintenance routines.

The common control comprises a plurality of bulk memories wherein records are maintained of all calls served by the plurality of switching units, the availability or service states of the lines, trunks, attendants' positions, time slots and control unit register equipment. Further, the control unit comprises a plurality of data receivers and transmitters for accepting information from and transmitting information to the plurality of switching units and a call processing arrangement termed an action translator for maintaining and updating the control unit records in accordance with stimuli received over the data receivers and the signaling trunks and for controlling the transmission of control data from the control unit to the plurality of switching units.

In accordance with one feature of this invention, a plurality of private branch exchange switching units which are located at or near a customer's premises are controlled by a single control unit which serves all of the switching units in common.

In accordance with another feature of this invention, each switching unit comprises a plurality of time division links.

In accordance with another feature of this invention, each link and each trunk served by the time division switching network has direct access to all of the plurality of time division links.

In accordance with another feature of this invention, PBX conference calls are established by means of a time division gate which selectively interconnects links of the switching network.

In accordance with another feature of this invention, each switching unit comprises a scanning and memory circuit wherein a record is maintained of the supervisory state of all extensions and trunks served by the switching network, and requests for attention are transmitted to the common control unit only after a change in supervisory state has occurred in a line or trunk, et cetera.

In accordance with another feature of this invention, the time division switching network serves one or more attendant consoles which are selectively connectable to the links of the switching network under the control of signals from the control unit.

In accordance with another feature of this invention, the PBX switching network and the common control unit are interconnected by central office trunks and tie trunks for the establishment of talking paths; signal trunks for the transmission of call signaling information to the common control unit and by a pair of oppositely sensed unidirectional data channels which are employed to transmit requests for attention from the PBX to the control unit and to transmit instructions from the control unit to the remote switching unit.

In accordance with another feature of this invention, information concerning actions of an operator, for example, the operation of control keys at an attendant's console, are detected by the supervisory scanning and memory circuitry at the switching network and changes in attendant key settings are transmitted in the form of relatively slow speed data from the private branch exchange switching network to the control unit.

In accordance with another feature of this invention, a record is maintained at the control unit of the status of the calls served by the system, the service states of extensions, trunks, register, et cetera, and the control unit updates such records by means of an action translator which responds to prior system conditions and new external stimuli such as changes in supervisory state and call signaling information.

The above and other objects and features of this invention can best be understood in reference to the drawing in which.

Figures 2, 14:
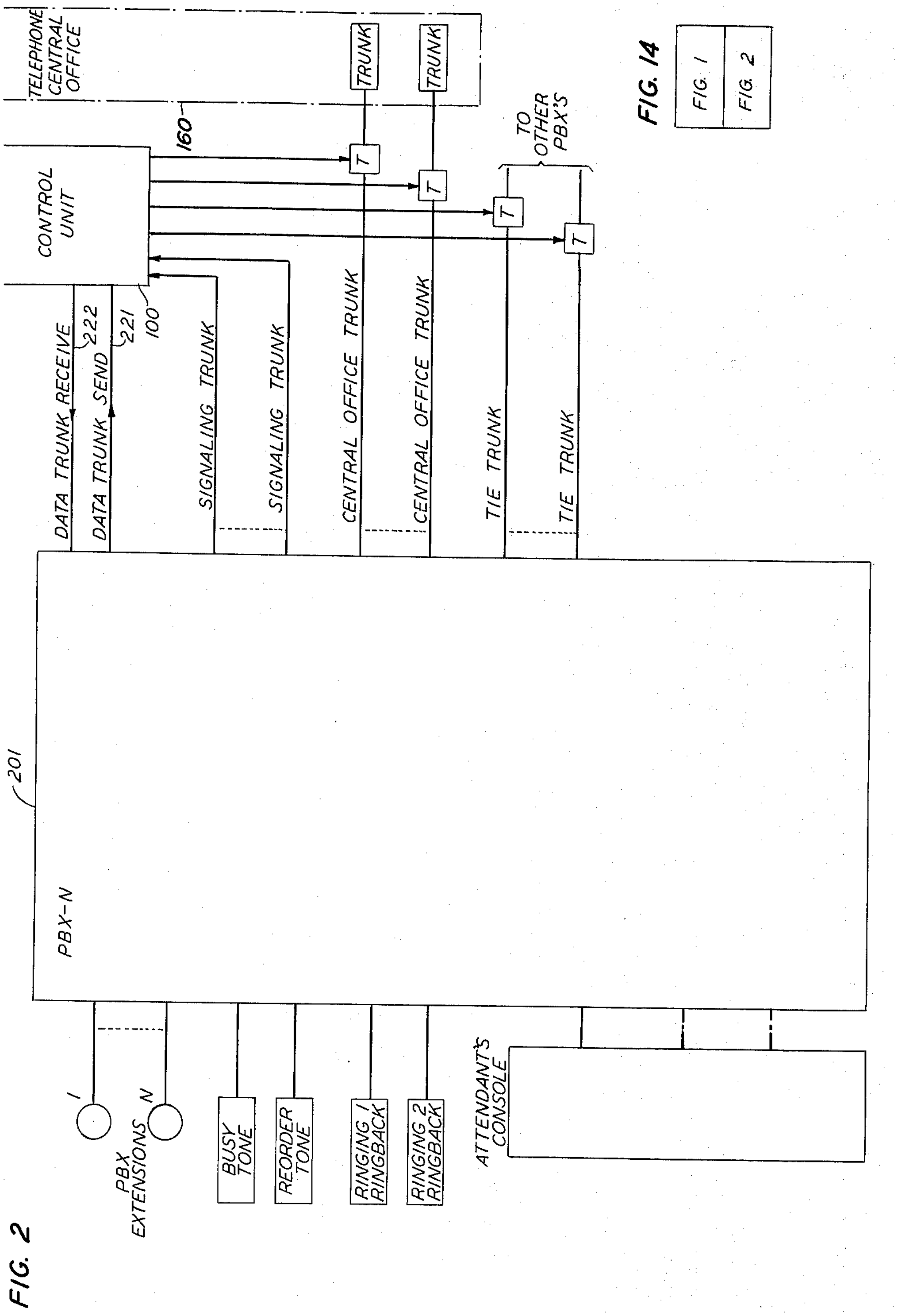
Figure 15:
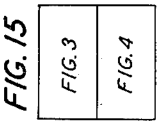
Figures 12, 16:
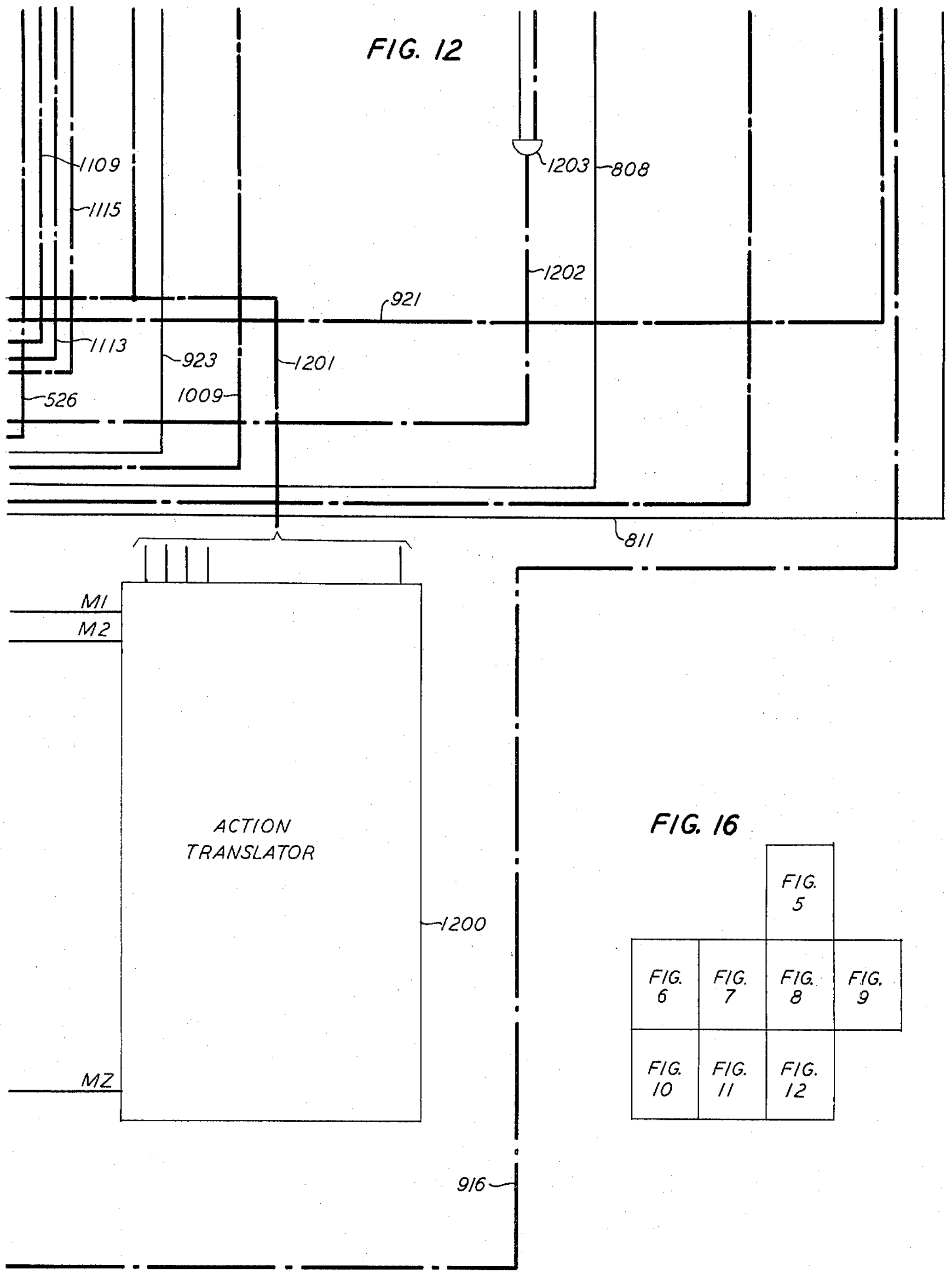
Figure 13:
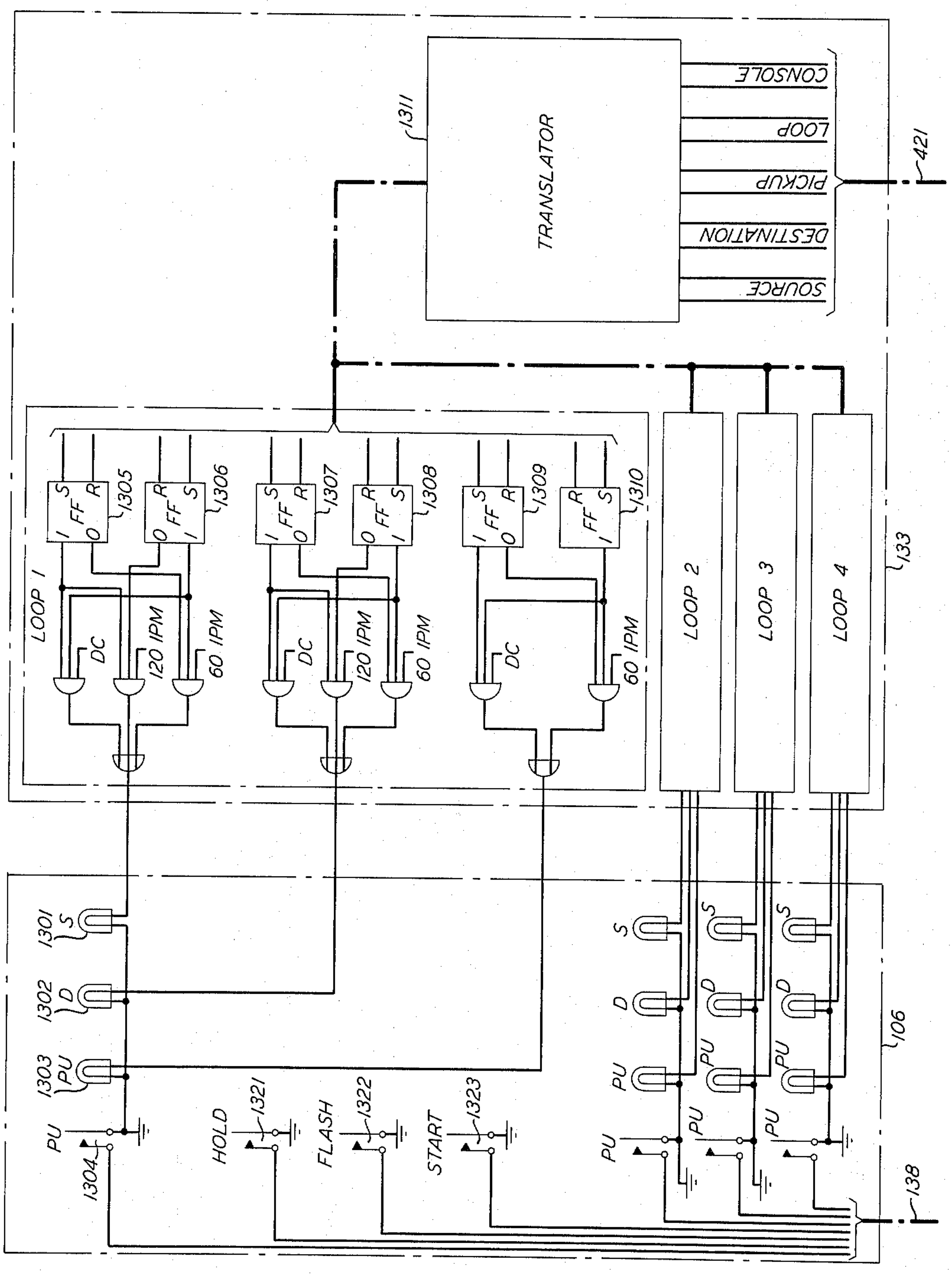
FIG. 13 shows the loop and key circuits at an attendant's console.

FIGS. 14 through 16 show the arrangement of FIGS. 1 and 2, 3 and 4, and 5 through 12, respectively.

INDEX

1. General description
2. PBX switching network and control circuitry 101
3. PBX central control unit 100
4. Detailed call through the system
5. Detection of a service request
6. Finding an idle time slot 7. Assignment of a signal receiver
8. Assignment of a signaling trunk
9. Establishing the signal receiver connection
10. Registration of call signaling information
11. Sequential service of time slots
12. Evaluation of registered call signaling information
13. Assignment of a trunk
14. Completion of registration of call signaling information
15. Release of the signaling receiver
16. Abandonment of the call before answer
17. Detection of a switchhook flash or a release request
18. Attendant call
19. Evaluation of registered call signaling information
20. Incoming call (direct inward dialed)

1. *General description (FIGS. 1 and 2)*

Figure 1:
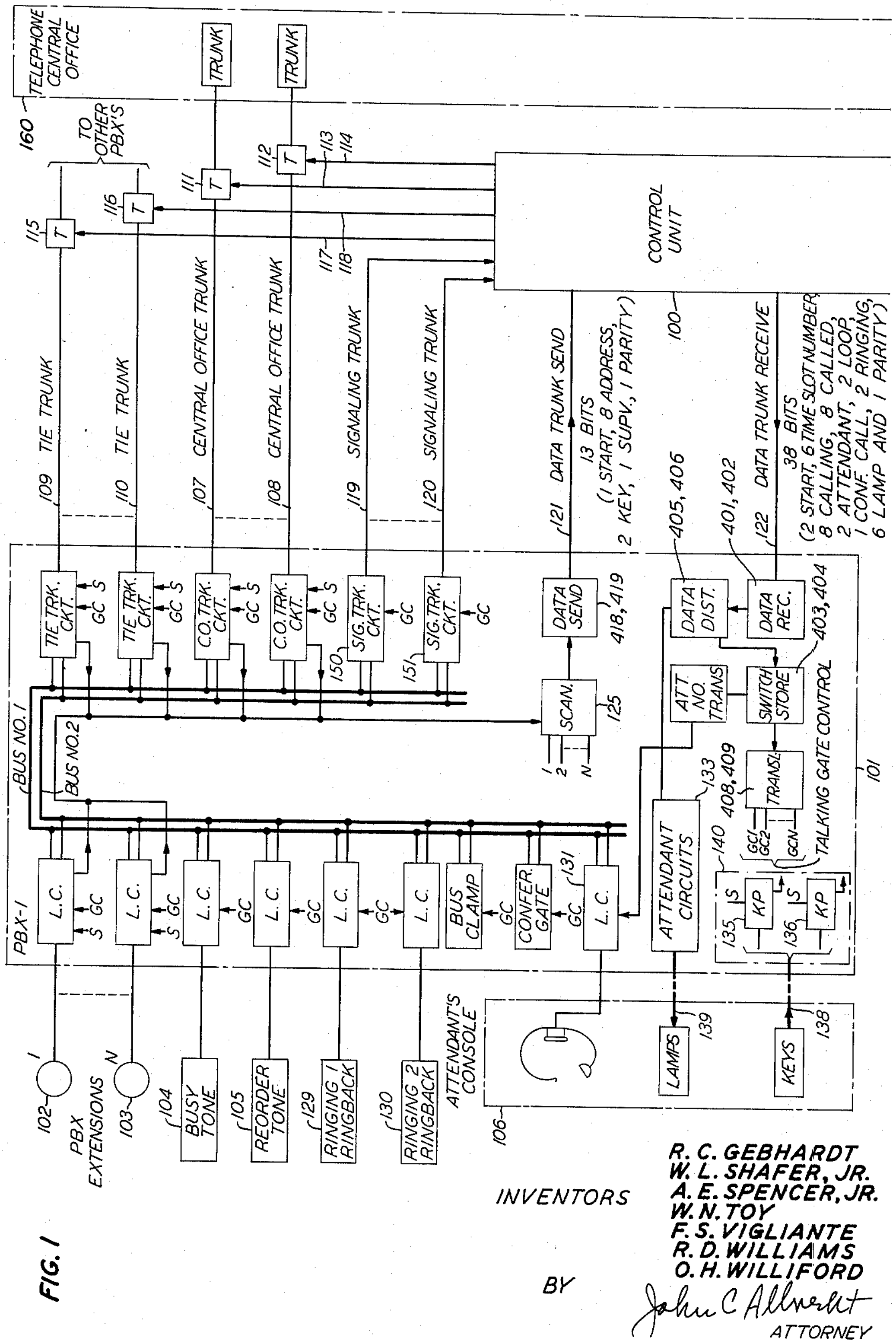
FIGS. 1 and 2 are block diagram representations of a private branch exchange system in accordance with this invention.

FIGS. 1 and 2 show a control unit 100 which serves a first PBX switching network 101 and a second PBX switching network 201. The second PBX switching network 201 is similar to the first switching network 101; however, as is the case in many private branch exchanges, there may be many differences in the services provided by these two switching networks. For example, the number of extensions, the number of central office trunks, tie trunks, signaling trunks and attendants' consoles are determined by the traffic requirements of the PXB subscriber group and the numbering plan of the extensions and special services are discrete to the customer group.

The overall system philosophy may be understood by consideration of FIG. 1. The switching network 101 as set forth in FIG. 1 is shown to include a variety of control and memory circuits in addition to the switching links and gates. The functions of these control and memory circuits are described later herein. The switching network 101 serves a plurality of extensions such as 102 and 103. In this one specific illustrative embodiment a switching network such as 101 may serve a maximum of two hundred extensions.

The normal telephone system tones such as busy tone, recorder tone, ringing tone, ringback tone, et cetera, are generated at the switching unit by sources such as 104, 105, 129, and 130 and, as described later, are selectively connected to the PBX extensions such as 102 and 103. The attendant's console 106 provides operator service for the private branch exchange. In FIG. 1 only one attendant's console is shown; however, in the subject system three attendants' consoles may serve a single switching network such as 101.

The switching network 101 is connected to the control unit 100 by three general types of transmission facilities. The first type of transmission facility is represented by the central office trunks such as 107 and 108 which connect the switching network 101 to the general telephone switching network of the telephone central office 160 and the tie trunks such as 109 and 110 which connect the switching network 101 to other PBX locations. As shown in FIG. 1, both the central office trunks 107 and 108 and the tie trunks 109 and 110 are connected to the control unit 100. That is, the trunk circuits 111 and 112 of the central office trunks 107 and 108 are connected to the control unit 100 by way of control conductor groups 113 and 114, respectively, and the trunk circuits 115 and 116 of the tie trunks 109 and 110 are connected to the control unit 100 by way of control conductor groups 117 and 118, respectively. As will be seen in the more detailed discussion of the control unit 100, these connections over control conductor groups 113 and 114, 117 and 118 provide means for transmitting supervisory and call signaling information forward to the central office 160 or to the other PBX locations which are not shown in FIG. 1.

The second type of transmission facility connecting the switching network 101 and the control unit 100 is represented by the signaling trunks 119 and 120. The signaling trunks 119 and 120 provide a transmission path from a calling extension such as 102 or 103 to digit receivers in the control unit 100 which are provided for registering call signaling information other than switchboard flashes. Call signaling information in the form of multi-frequency touch tone digit signals which originate at an extension of the switching unit are transmitted over one of the signaling trunks such as 119 and 120 to the digit receivers in the control unit 100. The touch tone signals are transmitted from the extensions through the switching network and via the signaling trunks to the signal receivers in the same form as they were originated at the extension.

The third type of transmission facility comprises the data send and data receive trunks 121 and 122. The data send trunk is a unidirectional trunk which connects the switching network 101 and the control unit 100 for the purpose of transmitting data relating to changes in supervisory state from the switching network to the control unit. The data receive trunk 122 is a unidirectional slow speed data trunk for transmitting control signals, i.e., concerning the establishment and disestablishment of connections and signals within the switching network from the control unit 100 to the switching network 101.

The data send trunk 121 terminates in data send circuits 418 and 419 which are located at a switching unit and in a data receiver such as 602 or 1000 at the control unit. Similarly, the data receive trunk 122 terminates in a data transmitter such as 618 at the control unit and in a pair of data receivers 401 and 402 at the switching unit. Information is transmitted in both directions by means of frequency shift signals. That is, a first signal of one frequency is transmitted to represent 0's in a digital message and signals of a second frequency are transmitted to represent 1's in a digital message. The data transmitter 618 includes input buffering circuitry which permits the accumulation of at least two messages to permit information to be transmitted on a slow speed serial basis from the control unit to the switching unit. Similarly, the data receivers 401 and 402 include register means for assembling the received serial message. That is, as a message is received over the trunk 122 the information is placed in memory in the data receivers 401 and 402 for subsequent transfer to the switch stores 403 or 404 and to the attendant's circuit via the data distributors 405 and 406.

For the other direction of transmission the data send circuits 418 and 419 also comprise input buffering registers to permit at least a second message to be assembled while a first message is being serially transmitted from the switching unit to the control unit. The data receiver such as 602 also includes register means for assembling the incoming serial message for subsequent parallel transfer through the control unit. In each instance the amount of buffering memory employed is sufficient to meet maximum data traffic conditions and data speed of transmission.

The data receive trunk is also employed to transmit maintenance alarm and maintenance status messages from the control unit 100 to the switching network 101.

2. *PBX switching network and control circuitry 101 (FIGS. 3 and 4)*

Figure 3:
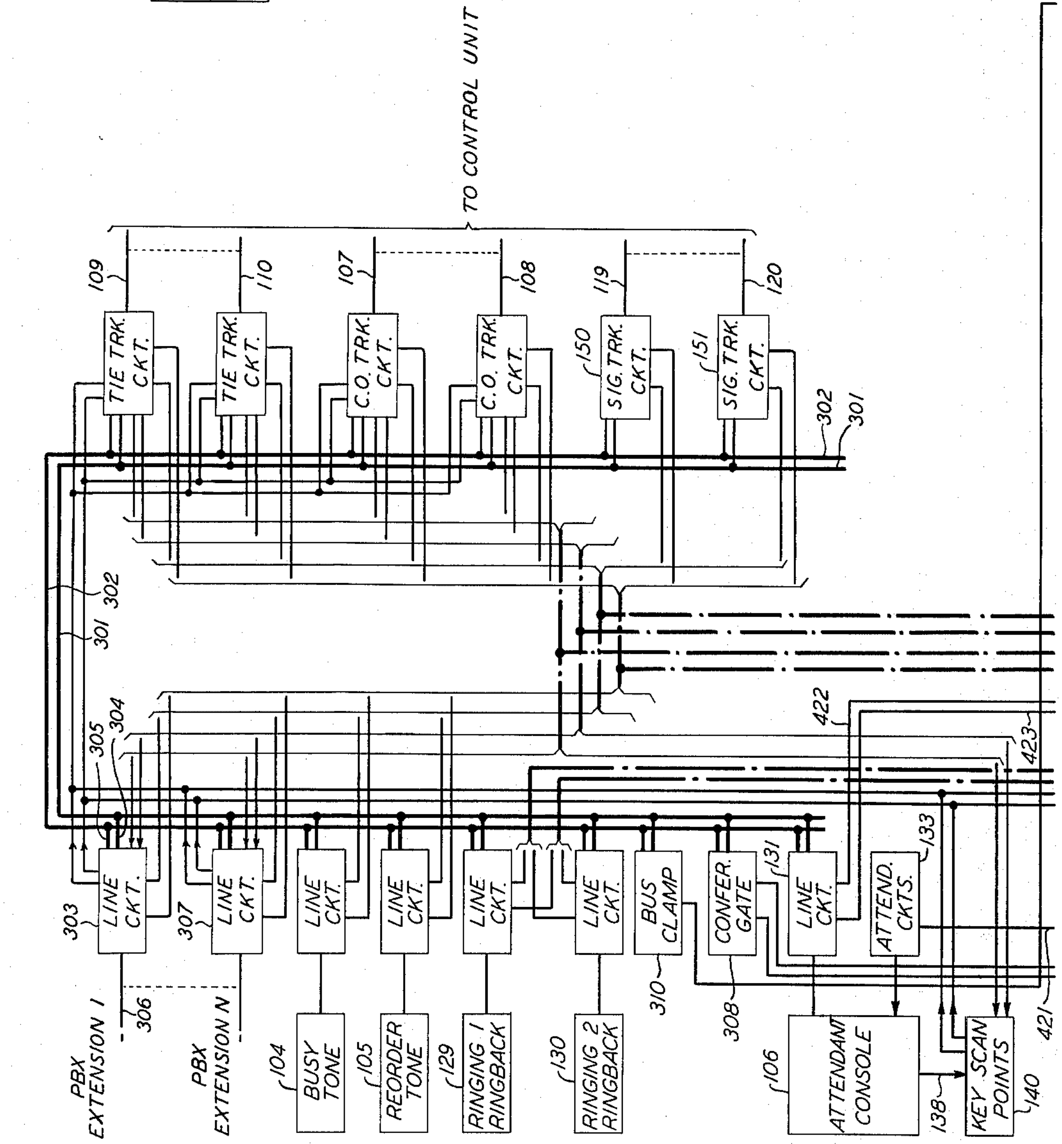
FIGS. 3 and 4 are a more detailed representation of the control and switching apparatus which is discrete to a customer's premises.
Figure 4:
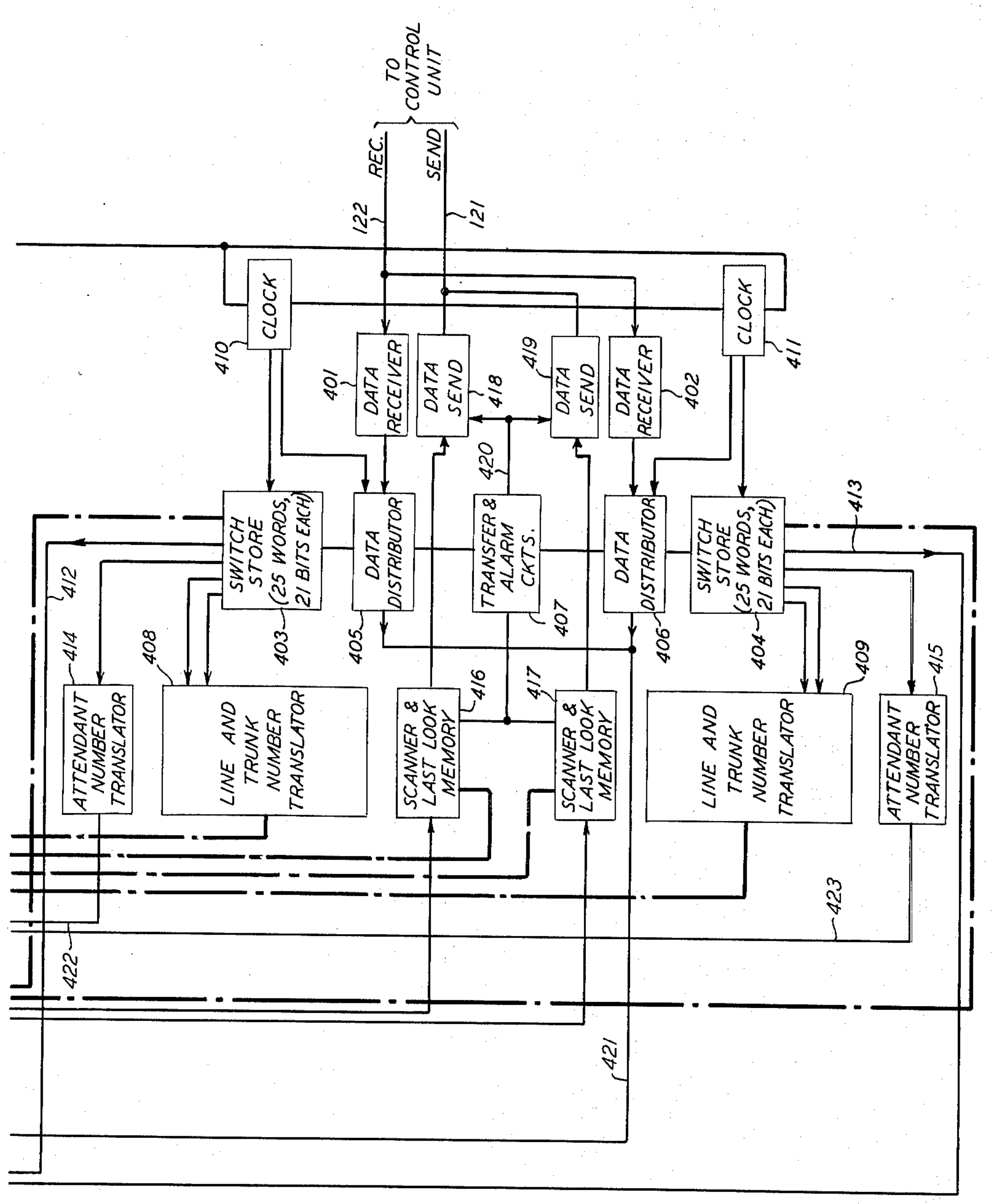

The PBX switching network and control circuitry 101 of FIG. 1 is shown in greater detail in FIGS. 3 and 4. FIGS. 3 and 4 expand upon FIG. 1 to show the association of the switch store, the associated line and trunk number translator, the scanner and last look memory circuit and the data receive and send circuits with the transmission links.

As previously noted, the switching network is a pulse amplitude modulation time division switching network. An office timing cycle comprising twenty-five time slots and having a time slot sampling rate of at least 8,000 cycles per second is employed in this system. As is well known, the time slot sampling rate must be at least two times the maximum frequency to be transmitted by the system. The switching network as shown in FIG. 3 comprises a first transmission link 301, a second transmission link 302, and a plurality of gate circuits which are associated with PBX extensions, tone sources, central office and tie trunks, signaling trunks, test circuits, and the attendant's console talkiing circuits. The link circuits 301 and 302 are identical and each of the above-noted circuits has access to both of the link circuits. That is, the line circuit 303 of PBX extension 1 has access to link 301 via transmission path 304 and access to link 302 via transmission path 305. Similarly, the line circuits of the remaining PBX extensions also have access to links 301 and 302. Each line circuit such as 303 comprises gating circuits for selectively connecting a transmission path such as 306 which is associated with PBX extension 1 to the two links 301 and 302. An intra-PBX call, that is, a call between extensions served by the same PBX switching unit, is accomplished by enabling the line circuits of the extensions to be interconnected during the same time slot. Similarly, connections between the line circuits and tone sources and both transmission and signaling trunks are similarly accomplished by enabling the line circuits and trunk circuits in a common time slot. The link circuits are operated independently of each other except during conference calls; therefore, each link circuit serves twenty-five time slots and a switching network effectively comprises fifty time slots. The time slots of the two 301 corresponds in time position to the first time slot of links are synchronized, that is, the first time slot of link link 302, et cetera. A conference connection is established by assigning the conferees' extensions to simultaneous time slots in the two links. In any given time slot, for example in time slot 5, two line circuits such as 303 are enabled to connect a PBX extension to link 301; one or two line circuits such as 307 are enabled in time slot 5 to connect an extension such as N to link 302 and simultaneously the conference gate 308 is enabled to connect the two links together.

The line circuits, both those associated with PBX extensions and those associated with the tone sources; the trunk circuits, both transmission and signaling; the conference gate; the test line circuits; and the attendant's circuits are all controlled in accordance with information transmitted from the control unit to the PBX switching unit. A control message in this system may concern the establishment or disestablishment of connections within the switching unit or may order or remove signals to the attendant's console or to the maintenance circuits. In this one illustrative embodiment the message comprises the following elements:

(1) Start signal (2 bits)
(2) Time slot number (6 bits)
(3) Calling party number (8 bits)
(4) Called party number (8 bits)
(5) Ringing (2 bits)
(6) Attendant's console number (2 bits)
(7) Attendant loops (2 bits)
(8) Attendant's lamp control (6 bits)
(9) Conference call (1 bit)
(10) Parity (1 bit)

As seen in FIG. 4, a single send data channel 121 and a single receive data channel 122 are employed between a switching unit and the control unit. However, the data receive channel 122 is connected to and serves duplicate data receivers such as 401 and 402. The data receivers 401 and 402 are demodulating and memory devices which normally serve associated switch stores such as 403 and 404; however, in the event of failure within the data receive circuits, the data distributors, or the switch stores, the data receivers such as 401 and 402 may be reassociated to maintain operation within the switching network. For example, as shown in FIG. 4, data receiver 402 is normally associated with switch store 404; however, upon a maintenance signal from the control unit, the data receiver 402 may be associated with the switch store 403. The data distributors 405 and 406 serve to connect the data receivers 401 and 402 to the switch stores such as 403 and 404 and, in addition, serve to connect the data receivers 401 and 402 to the transfer and alarm circuits 407. In that the data receivers 401 and 402 are connected in parallel to the data receive channel 122, the output signals from the data receivers should, under normal operating conditions, be identical. Therefore, it is possible to compare these output signals in the transfer and alarm circuits 407 to detect an operating difficulty in either of the data receivers or the data distributors. The data distributors 405 and 406 also serve to transmit control information over lead 421 to the attendant's circuits 133. In the event of failure of a data receiver, a data distributor, a switch store, or the associated line and trunk number translators such as 408 and 409, the switching network control circuitry is reorganized to maintain service. In this event, one group of twenty-five time slots is temporarily lost and the system continues to operate with the remaining twenty-five time slots.

The timing of work operations within the switching network is under control of the clock circuits 410 and 411. These clock circuits run independently of each other and each may serve its associated circuits in the event of failure of the other clock circuit; however, in that synchronism should be maintained between the time slots of the two links 301 and 302, there is circuitry within the clocks 410 and 411 for maintaining their output signals in time relationship. In the event that the clocks 410 and 411 fall out of step with each other, the link circuits 301 and 302 may continue to operate independently of each other; however, under these conditions it is impossible to maintain a conference call until such time as the clocks are brought back in proper time relationship.

The switch stores 403 and 404 are identical word-organized memories. There is capacity for twenty-five words corresponding to the twenty-five time slots in each of the two memories. In this one illustrative embodiment each word is twenty-one bits long and provides storage space for the calling party number (eight bits), called party number (eight bits), conference call (one bit), attendant's console number (two bits), and ringing control (two bits).

Data messages received over the receive data channel 122 appear as output signals from the data receivers 401 and 402 and are then selectively transmitted by the data distributors 405 and 406 to the appropriate switch stores 403 and 404, the attendant's circuits such as 133, and the transfer and alarm circuits 407. As previously noted, the data message from the control unit to the switching unit in addition to extension and trunk addresses also comprises a 2-bit start signal, a 6-bit time slot number, 2 bits for selection of an attendant's console and 1 parity bit. One bit of the 6-bit time slot number indicates whether the data is to be stored in switch store 403 or 404. The time slots are numbered from 1 through 50 in a two piece 6-bit binary code. Five bits of the binary number indicate the position of the time slot within the particular link timing cycle and the sixth bit indicates the link to which the time slot is assigned. That is, the time slots employ the numbers 1 through 25 in a 5-bit binary code along with a single sixth bit which indicates whether the time slot is odd or even in the 1 through 50 numbering plan. The binary numbers 1 through 25 when accompanied by a 0 in the sixth bit position represents the odd numbered time slots 1, 3, 5, 7 . . . 49 and the time slots with the 5-bit binary numbers 1 through 25 when accompanied with a 1 in a sixth bit position represent the even numbered time slots 2, 4, 6, 8 . . . 50. The switch store 403 serves the odd numbered time slots and the switch store 404 serves the even numbered time slots. It should be noted that as indicated above there is synchronism between the twenty-five time slots of switch store 403 and the twenty-five time slots of switch store 404; therefore, time slots 1, 3, 5, et cetera of switch store 403 correspond in time to the time slots 2, 4, 6, et cetera, respectively, of switch store 404.

The line and trunk number translators 408 and 409 are identical and serve to translate the 8-bit binary calling party and called party numbers to provide enabling signals to the appropriate line or trunk gates.

The conference gate 308 is under the control of enabling signals from the switch stores 403 and 404 on conductors 412 and 413, respectively. That is, in a time slot in which a conference call is to be served, a 1 is written in the conference section of one of the switch store memories in the conference time slot, and in the ensuing office cycles one of the enabling conductors 412 and 413 is energized.

The bus clamp circuit 310 is under control of the clocks 410 and 411. The line circuits, trunk circuits and attendant's circuits are operated during first discrete portions of the time slot in which they are served to provide the desired transmission paths and the bus clamp circuit is operated during a second discrete portion of each time slot in order to remove any residual signal on the links and therefore prepare them to serve the immediately succeeding pair of communication paths without crosstalk from the paths served in preceding time slots. As previously noted, the clocks 410 and 411 serve to time all functions within the switching unit. The line circuits, the trunk circuits and the attendant's circuits are all controlled by switch store output signals which occur in time relations established by the clock circuits. The bus clamp circuit 310 operates directly from the clock circuits 410 and 411 and serves to clamp the transmission links after each time slot transmission period. The attendant's circuits 133 are controlled by output signals from the data distributors 405 and 406. The attendant at the console is connected by line gate circuits such as 131 to the links 301 and 302 and, in addition, the attendant's circuit 133 provides lamp and key circuits to alert the attendant and to permit her to achieve desired results such as the holding of a call on one loop while answering a call on another loop. Attendant lamp and key circuits will be described with respect to an attendant call.

In FIG. 1 there are shown four tone sources, 104, 105, 129, and 130, namely, busy tone, reorder tone, ringing 1 and ringback, ringing 2 and ringback. Busy tone and reorder tone are connected to a transmission bus by gate circuits which are controlled in the same manner as the gate circuits of extensions and trunks. Ringing 1 and ringing 2 are differently coded ringing signals which permit extensions to be rung in two distinct ways. The ringing and ringback tone circuits are connected to the transmission bus under the control of separate ringing bits and not by normal gate signals such as are employed in the control of the extension, trunk, busy, and reorder tones. The ringing and ringback circuits are arranged to provide ringing and ringback signals to the transmission bus in alternate frames. A frame herein is defined as a period of time successive enablements of a gate circuit in a given time slot, that is, the gates are enabled cyclically at a frame rate which is $\frac{1}{25}$ of the time slot rate.

3. *PBX central control unit 100* (*FIGS. 5 through 12*)

FIGS. 5 through 12 comprise a block diagram representation of the control unit. Circuit details of the blocks are not disclosed herein as such detail is known to those skilled in the art and their disclosure herein would merely tend to obscure the invention. Electronic techniques are employed generously throughout the system; however, in this one illustrative embodiment a few electromechanical devices have been shown. Transistor resistor logic generally referred to as T.R.L. is employed throughout both the switching unit and the control unit. A general description of transistor resistor logic circuits may be obtained by referring to an article entitled "Transistor NOR Circuit Design" by W. D. Rowe and G. H. Royer in volume 76, Part I, of the Transactions of the American Institute of Electrical Engineers, Communications and Electronics, July 1957, pages 263–267. For example, in both the switching units and in the control unit the translators comprise transistor resistor logic arranged to accept the stated input signals and in response thereto provide the stated output signals. For example, in the switching unit the attendant number translators 414 and 415, the line and trunk number translators 408 and 409, and the attendant's translator 1311 all comprise transistor resistor logic. In the control unit the call status store address translator 600, the 8-bit binary to one of four translator 1024, the progress mark translator 1100, the switch unit address translator 704, the line and trunk information store address translator 806, the make-idle translator 920, the one-out-of-sixty-four to binary translator 912, the supplementary information store address translator 901, the digit translators 904, 905, and 906, the network control translators 516 and 528, the trunk seize and release circuit 535, and the digit translator 519 all comprise transistor resistor logic. The input signals to these translators and the output signals derived therefrom are stated later herein with respect to the descriptions of the various functions thereof.

Two types of bulk memory are employed herein, namely, temporary memory and semipermanent memory. Temporary memory is defined herein as a memory arrangement which is changed from time to time by system action without any external manual or mechanical action and semipermanent memory as defined herein is a memory arrangement wherein information content is changed by an external act such as a physical change in the memory. Although not limited thereto, the temporary memory elements employed herein are ferrite sheets which are word organized as set forth later herein. Ferrite sheet memories are well known in the art and are described in R. L. Ashenhurst-R. C. Minnick Patent No. 2,912,677 which issued November 10, 1959.

The semipermanent memory employed herein is a word organized capstor which is also well known in the art having been disclosed in the E. R. Kretzmer Patent No. 3,098,996 which issued July 23, 1963.

A twistor memory such as disclosed in an article entitled "New Storage Element for Large Sized Memory Arrays—The Twistor" by A. H. Bobeck in volume 36, No. 6, of the Bell System Technical Journal, November 1957, pages 1319–1340, could also be employed herein wherever semipermanent memory is required.

Examples of apparatus comprising semipermanent memory are the action translator 1200 and a portion of the line and trunk information store 802.

The counting circuits such as the time slot number counter 605 and the switch unit counter 703 and the various register circuits such as the call status store register 701, the line and trunk store register 800, the supplementary information store register 902, comprise transistor circuits which are arranged to respond to the signals which are derived from the particular apparatus with which these elements cooperate. For example, the call status store register 701 is arranged to respond to output signals from the call status store 700 and, in turn, is arranged to provide input signals to the call status store 700.

The AND gates and OR gates generally comprise transistor resistor logic. In FIGS. 5 through 12 logic circuit representation is simplified in that a single gate symbol on the drawing may represent a plurality of gates serving a plurality of information conductors of a cable. Connections to points outside of FIGS. 5 through 12 are labeled in accordance with the numbering established in FIGS. 1 and 2. Elements wholly within FIGS. 5 through 12 are labeled with three or four digit numerals. In this labeling plan the first digit of a three-number label designates the figure on which the element resides or originates and, in the case of four-digit labels, the first two numbers indicate the figure on which the element resides or originates.

The control unit 100 serves a number of PBX switching units such as 101 and 201 in accordance with external stimuli received over the data trunks such as 122 and 222 and signaling trunks such as 119 and 120 from the switching units. The control unit 100 maintains a record of all calls served by the switching units and on a serial basis examines this information and alters it in accordance with external stimuli. In addition, the common control unit maintains a record of the supervisory states of lines and trunks and the availability of various units such as the signal receivers 501 and 502 and time slots of each of the switching units.

A record relating to the calls served by the control unit 100 is maintained in the call status store 700. The call status store 700 is a word-organized random access temporary memory wherein a forty-five bit word per time slot is maintained. The forty-five bit time slot status word comprises the following elements:

(1) Progress mark (8 bits)
(2) Line "A" (8 bits)
(3) Line "B" (8 bits)
(4) Transmission trunk (6 bits)
(5) Attendant console and loop (4 bits)
(6) Signal receiver (5 bits)
(7) Signaling trunk (6 bits)

Figure 7:
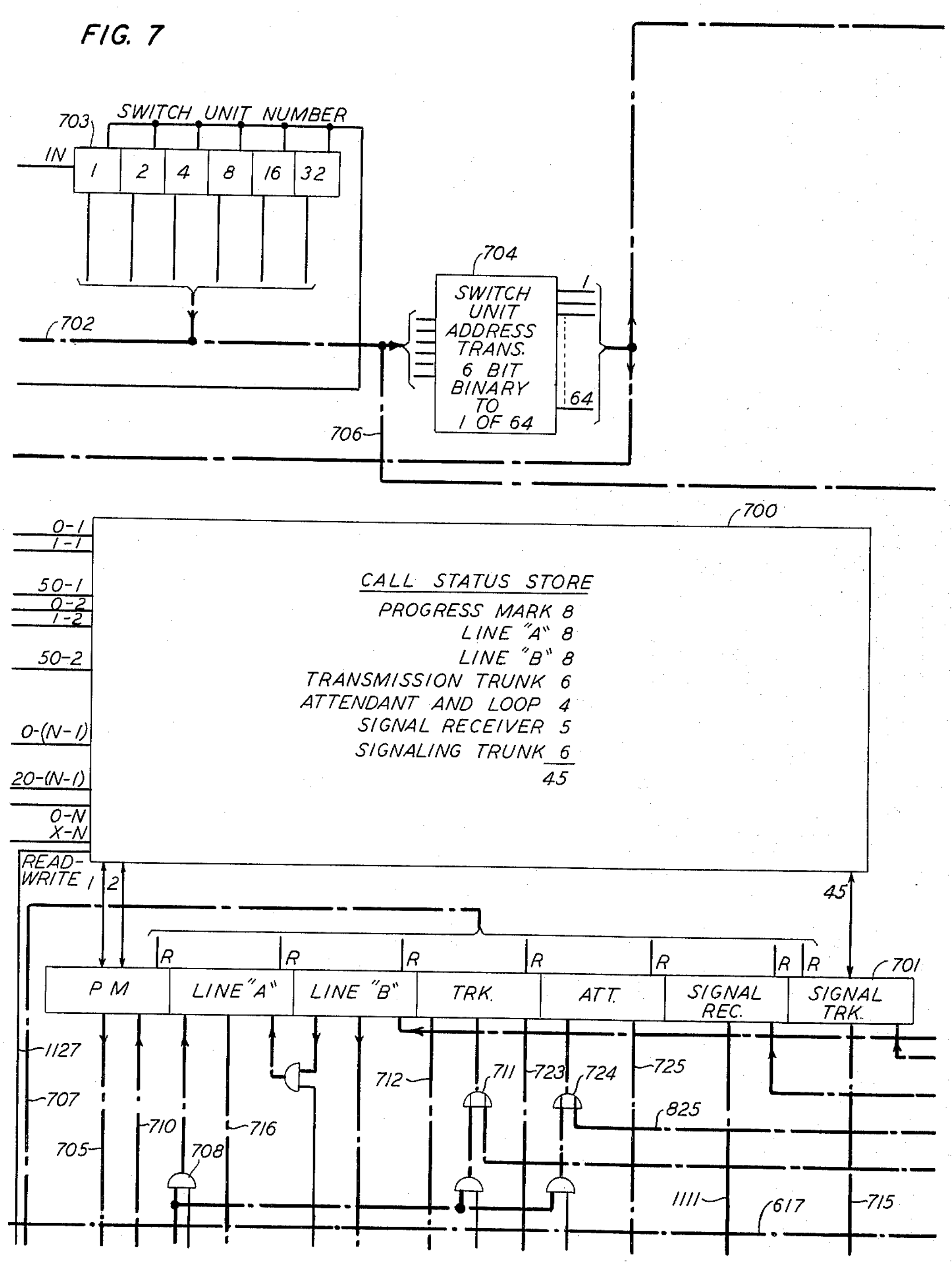
Figure 8:
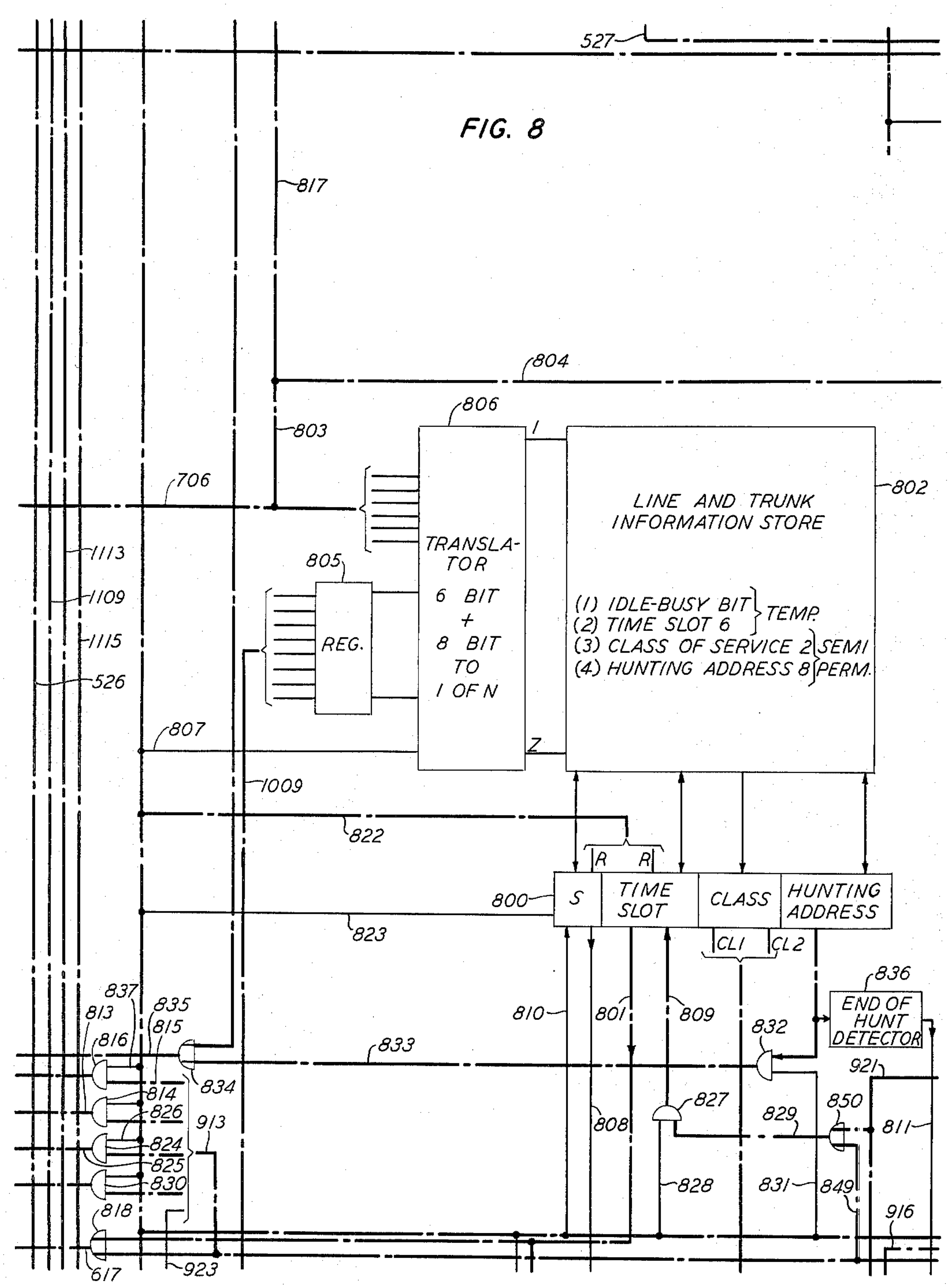

As shown in FIG. 7, the call status store word is organized from left to right, and the words are in the memory from the top of the bottom of the figures.

A switching unit may serve only a few lines, for example, ten to twenty, or may serve as many as two hundred lines. The number of time slots which are employed within a switching unit is dependent upon the number of lines served by the switching unit and the traffic generated by those lines. That is, a switching unit serving a few lines will require only a few time slots, and a switching unit serving a large number of lines will generally require a large number of time slots. As previously explained, fifty is the maximum number of time slots available to a switching unit.

The call status store 700 is interrogated and information is inserted in the store by addressing the store through one of the leads 0–1 through X–N shown at the left side of FIG. 7 along with a read or write signal, respectively, on conductor 1127. That is, leads 0–1 through X–N may be enabled on a mutually exclusive basis to effect transfer of information from the call status store 700 to the register 701. Similarly, information may be selectively transferred from the register 701 to the call status store 700 by addressing the call status store in the same manner. The address leads 0–1 through X–N comprise the output conductors of the translator 600. The translator 600 converts two 6-bit binary words to a one-out-of-many indication on its output conductors. The first 6-bit word input to the translator 600 comprises the switching unit number on cable 702. The second 6-bit input word to the translator 600 comprises the time slot number within the switching unit and may be transmitted to the translator 600 from a number of sources over cable 601. The labeling of the output conductors of the translator 600 reflects the number of the switching unit and the time slot within the switching unit. The first number of the label indicates the time slot within the switching unit, and the number following the dash mark indicates the switching unit number. For example, the label 0–1 represents the 0 time slot of the first switching unit, and the label 50–1 represents the fiftieth time slot of switching unit No. 1. The above discussion indicates that there are fifty-one time slots, 0 through 50, associated with switching unit No. 1, while prior discussions indicate a maximum of fifty time slots associated with each switching unit. The 0 time slot label is a slight misnomer in that the word in the call status store associated with the 0 time slot provides a mechanism for interrogating the data receivers before proceeding to an ordered sequential service of time slots of a switching unit. If there is an indication that a data receiver such as 602 or 1000 has a complete message relating to a line, trunk, or attendant's console of the switching unit presently being served by the control unit, the control unit will act upon this message before proceeding to the sequential service of the time slots within the switching unit. The data message may relate to a call origination or to a call presently served by the control unit. In either event, the control unit will interpret the message and take action in accordance with this interpretation. For example, if the data message relates to request to originate a call, the control unit will assign a time slot to the request and before proceeding to the service of the remaining time slots of the switching unit, the control unit will assign a signaling receiver and a signaling trunk so that the subscriber requesting service may proceed with the call. The information relating to the request, i.e., the number of the communication path requesting service and the elements assigned to the request must be recorded in the call status store at the information location associated with the assigned time slot. Accordingly, the call status store is addressed during the 0 time slot to the location of the newly assigned time slot to permit insertion of an appropriate call status word. Similarly, if a data message relates to a call currently served, the control unit will address the call status store at the location of the time slot in which the call is served to permit updating of the call status word in accordance with the data message. Subsequently, the control unit serves the time slots of the switching unit sequentially and completely; therefore, a time slot may be served twice during one cycle of the control unit. It may be served a first time to accommodate a data message from a distant switching unit and a second time during the sequential service to the time slots.

Figure 6:
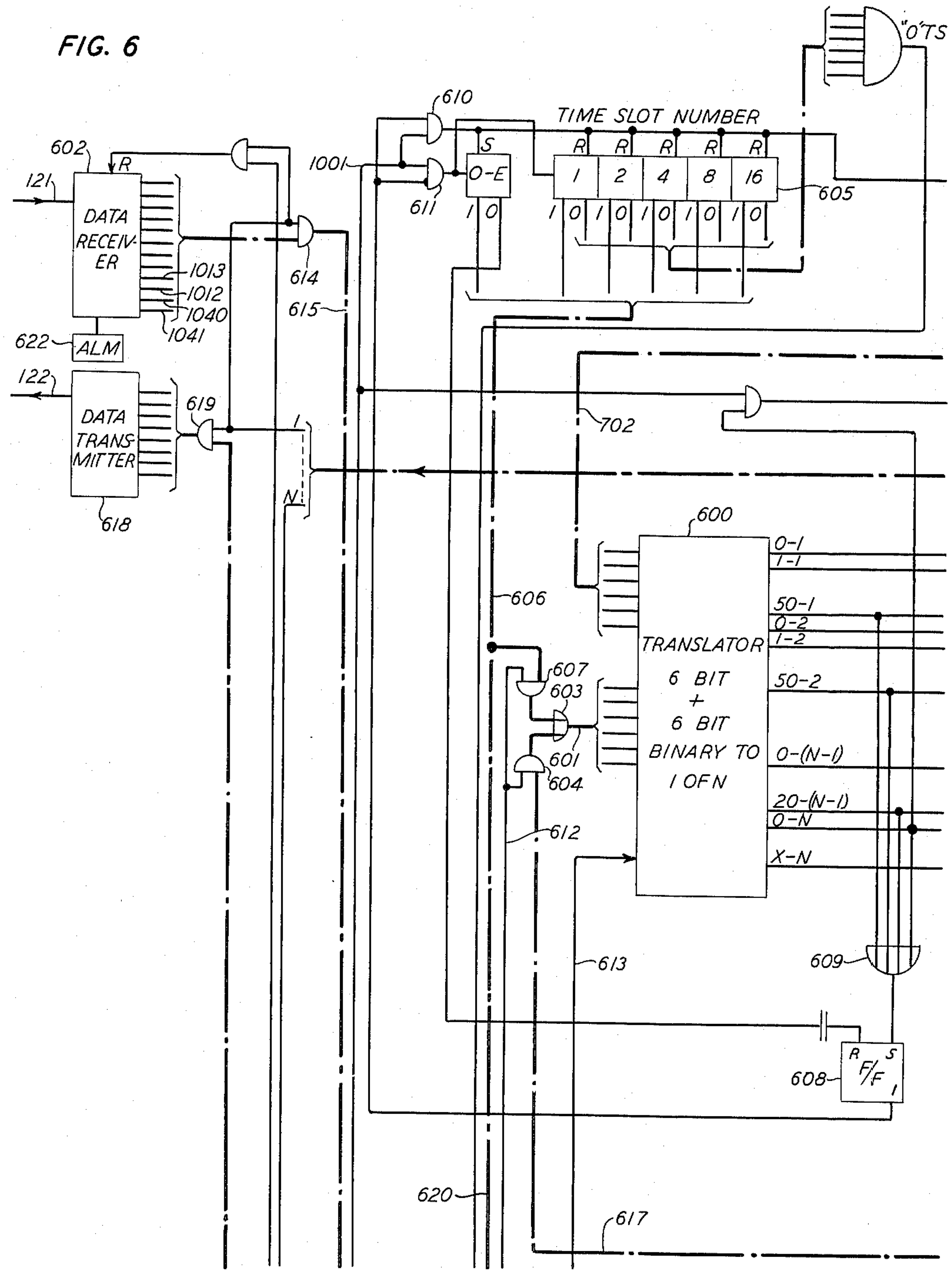

When the translator 600 is addressed during the 0 time slot to another time slot location in the proces of serving a data message, the time slot address information is transmitted from the register 800 to the OR gate 603 via cable 801, OR gate 818, cable 617 and AND gate 604. The manner in which the information is read to the register 800 is described later herein. Subsequently, when the call status store is being addressed sequentially, the time slot address information is derived from the time slot counter 605 and is transmitted to the translator 600 via cable 606 and AND gate 607. The time slot counter 605 is reset after the last time slot associated with a switching unit has been addressed. The recycling of the time slot counter 605 is under control of the flip-flop 608 which is set to its 1 state when the last time slot of a switching unit is served. For example, as shown in FIG. 6, there are conductors from the translator output conductors 50–1, 50–2, and 20–($N$—1) which, through OR gate 609, serve to set the flip-flop 608 when they are enabled. For example, when the translator conductor 50–1 is enabled, the flip-flop 608 is set to its 1 state, and the immediately following advance counter clock pulse on conductor 1001 is directed to the reset conductor for the time slot counter 605, rather than to the input of the time slot counter 605. This is accomplished in that the 1 output conductors of the flip-flop 608, when enabled, serve to enable AND gate 610 and to inhibit AND gate 611. The signals which serve to reset the time slot counter 605 also serve to advance to switch unit number counter 703. If fewer than sixty-four switch units are served by the control unit, the switch unit counter is arranged to recycle after the last switch unit is served.

The call status word as indicated on FIG. 7 includes a progress mark which indicates the status of the call. That is, from the time a call originates a request for service until the time the last release signal is received a call passes through many intermediate steps and associated with each step is a discrete progress mark. For example, a call origination is detected when an extension goes from on-hook to off-hook and at that time a progress mark is written in the call status store which indicates a request for service. At the same time the number representative of the calling extension is written in the line "A" location of the call status word. Subsequently, a signaling trunk and a signal receiver will be assigned to the call origination, and their numbers will similarly be written in the appropriate spaces in the call status store. When the signaling trunk and the signal receiver are assigned to a call, the progress mark will be updated first to indicate the attachment of a signaling trunk and subsequently to indicate the attachment of a signal receiver to the signaling trunk. As will be described later, there are many additional call progress marks, and illustrations of these will be given with respect to specific calls through the system.

All action within the control unit 100 is dictated by the progress mark relating to a particular call and other internal information such as line class information, all-trunks-busy indications, clock signals, and external stimuli in the form of supervisory information and call signaling information. The above-noted elements of information comprise the inputs to the progress mark translator 1100. In accordance with the progress mark translator input signals, the translator output conductors M1 through MZ, which may be several hundred in number, are enabled on a mutually exclusive basis. The output conductors of the progress mark translator 1100 comprise the input signals to the action translator 1200.

The action translator 1200 is a word-organized random access semipermanent memory which provides control signals for gating information throughout the system and for updating the progress mark in the call status word. Examples of action translator operation will be given later with respect to a specific call through the system.

The clock source 1002 provides timing signals on the output conductors C1 through CT. These timing signals dictate the times at which actions throughout the system are executed.

The line and trunk information store 802 comprises a word-organized random access memory wherein temporary and semipermanent information relating to the lines, transmission trunks, and operator keys of the system are stored. The temporary information comprises a 1-bit indication of the service state (busy or idle) of the line, trunk, or attendant's trunk and a 6-bit number which indicates the time slot which is assigned to a line or trunk. The switching unit to which the line or trunk is connected is indicated by the information word's position within the information store 802. Therefore, it is unnecessary to provide a switching unit indication in the information store 802. The semipermanent information comprises bits which indicate the class of service assigned a line, and an 8-bit number which is a hunting address, that is, an address of an alternate line which is employed in the event that the line under consideration is busy or out of service. The class of service indication may serve to indicate that a line is in a rotary group and that hunting is required, or, for example, that a line is restricted to intra-PBX calls. The hunting address may be the address of the next station in the directory number numerical series or may be any other station within the switching unit. That is, in this system hunting is not restricted from a low numbered line to a high numbered line, as is the case in a step-by-step system but, rather, hunting may be either up or down from the called line directory number and the numbers of a hunting group need not be adjacent numbers.

As will be described later herein there are a maximum of four loops associated with each attendant console; there is one key associated with each attendant loop and there are a number of common keys on each attendant console associated with all of the loops of that console. There is a memory line in the line and trunk information store 802 associated with each of the loop keys and with each of the function keys. A class of service signal on the CL1 and CL2 leads indicates to the progress mark translator that the information in the register 800 relates to a key rather than a line or a trunk and, in this case, the information in the hunting address portion of the register indicates to the progress mark translator the key function. This will be described in greater detail with respect to an attendant call.

The line and trunk information store 802 is interrogated by addressing the address translator 806 with an 8-bit address of the line or trunk under consideration and a 6-bit address of the switching unit in which the line or trunk terminates. The switch unit number is obtained from the switch unit number counter 703 over cable 706 and the line or trunk number which is obtained from several places under various operation conditions is brought to the register 805 over cable 1009.

In this one specific illustrative embodiment an 8-bit binary code is employed to define the extensions, the transmission trunks, the signaling trunks and the attendant's line circuit. Similarly, an 8-bit binary number is employed to define the items scanned at a switching unit. The signaling trunks require gate control signals to connect them to the desired extension or trunk; however, signaling trunks are not scanned in that they cannot originate changes in supervisory state. Accordingly, the binary addresses which are employed for control of the signaling trunks may be employed to define the attendant keys. Although a switching unit may not employ a full complement of extensions, transmission trunks, signaling trunks, and attendant loops, the binary numbers identifying these elements are taken from the appropriate block of numbers as set forth below.

For gate control:

| | |
|---|---|
| Extensions | 1 through 200. |
| Transmission trunks | 201 through 235. |
| Signaling trunks | 236 through 241. |
| Reorder tone | 242. |
| Busy tone | 243. |
| Maintenance | One or more of the remaining numbers from 244 through 255. |

Scanning points:

| | |
|---|---|
| Extensions | 1 through 200. |
| Transmission trunks | 201 through 235. |
| Maintenance circuits | 236 through 243. |
| Attendant loop keys | 244 through 255. |

The supplementary information store 900 contains information as to the availability of the trunks, time slots, and attendant loops of all switching units and information as to the availability of the signal receivers which are employed on a common basis by all of the switching units of the system. The supplementary information store is addressed through the translator 901. Two classes of input information comprise the input signals to the translator 901. The first class of information is a 6-bit binary address which indicates the number of the switching unit under consideration by central control, and the second class of information comprises mutually exclusive signals on the T, TS, and SR conductors. The T conductor when enabled indicates that an information line relating to trunks and attendant loops within the addrressed switching unit is to be considered; the TS conductor when enabled indicates that an information line relating to time slot within the addressed switching unit is to be considered; and the SR conductor indicates that the information line relating to the signal receivers is to be considered. The contents of an information line of the supplementary information store are transferred to the register 902 to permit the idle-hunt selector and make-busy circuit 903 to examine the supervisory state of the trunks, time slots, or signal receivers to find an idle trunk, time slot, signal receiver, or attendant's loop and to make a selected one of these busy or idle. The idle-hunt selector and make-busy circuit 903 serves to locate an idle time slot on the basis of a switch unit address and a signal on the TS conductor and will search for an idle signal receiver when the SR conductor is enabled. In addition to the attendant's trunks and the signaling trunks a number of different trunk groups may terminate in a switching unit to provide communication to the telephone central office and to other PBX locations. A single line in the supplementary information store contains the information relating to the availability of signaling trunks, attendant's loops, central office trunks and tie trunks. Accordingly, the idle hunt selector and make-busy circuit must be addressed with an additional piece of information to restrict hunting to an appropriate group of trunks. The assignment of trunks is discrete to a switching unit and the number of trunks within a group is a function of the traffic served by the switching unit. Trunks within a trunk group are sequentially numbered and information as to the trunk group, other than signaling trunks, to be searched is derived from the translators 904, 905, and 906 which interpret call signaling information recorded in the signal receivers such as 501 and 502. When the search is to be directed to signaling trunks, the SR conductor of cable 910 is enabled by the action translator 1200.

Call signaling information from PBX extensions is received by the signal receivers such as 501 and 502 over signaling trunks such as 119 and 120 of PBX switching unit No. 1. The initial digit or digits of the received call signaling information indicate the destination of the call in progress. This information is transmitted via conductor groups 503 and 504, AND gates 505, 506, OR gate 507 and cable 508 to the translators 904, 905, and 906 in parallel. Only one of the translators 904, 905, and 906 is enabled at any one time and this enablement is in accordance with the numbering plan of the switching unit associated with the call signaling message in the signal receiver 501 or 502 and the cross connections within the cross connection field 907. The three translators 904, 905, and 906 have been shown herein for clarity of presentation; however, a single large translator having its rule of action altered in accordance with the switching unit which is employing the translation facilities would obviously serve equally as well as the three translators shown. These translators take into account the need for a numbering plan and trunk group traffic capacity which is tailored to and consistent with the requirements of the individual switching units. The switching unit address is derived from the switch unit number generator 703 and the switch unit address translator 704. In this one illustrative example, the output conductors of the translators 904, 905, and 906 are labeled TG1, TG2, TG3 and ATT and these conductors are connected through OR gate 908 to the idle-hunt selector and make-busy circuit 903. These output conductors represent an indication that a call requires a trunk in trunk group No. 1, trunk group No. 2, trunk group No. 3, or an attendant call, respectively.

In this one specific illustrative embodiment, the interconnection of signaling trunks such as 119 and 120, signal receivers such as 501 and 502, and trunk circuits such as 111 and 112 is accomplished by way of crossbar switching networks 509 and 510. Crossbar switching network 509 is selectively controlled by means of the action translator 1200 to connect signaling trunks such as 119 and 120 from the PBX switching units to the signal receivers such as 501 and 502. Switching network 510 is arranged to connect signal receivers such as 501 and 502 to the trunks such as 111 and 115. That is, call signaling information from the PBX switching unit is received by and registered in the signal receivers 501 and 502 and supervisory and call signaling information is transmitted from the signal receivers to the trunk circuits 111 and 112 by way of the switching unit 510. The switching network 509 is under the control of the network control 511 which accepts over cable 512 input signals representative of the switching unit and signaling trunk of that switching unit and the number of the signal receiver to be connected to the named signaling trunk. Network control 513 accepts over cable 514 signals representing the switching unit being served and the trunk of the switching unit to be connected to the signal receiver and over cable 515 the number of the signaling receiver to be connected. The derivation of these input signals is described more fully with respect to an illustrative call to the switching system.

As previously noted, all action within the switching system is in accordance with information contained in the call status store 700, the line and trunk information store 802, the supplementary information store 900, and external stimuli from the switching units. Prior to the time that any calls are served in the system, the call status store indicates that all time slots within all switching units are idle, and the call status store is sequentially addressed to consider the time slots associated with each switching unit. As previously noted, there are a maximum of fifty active time slots assigned to a switching unit and, in addition, each switching unit is served in a 0 time slot. Service in the 0 time slot comprises steps to determine whether or not there is a complete data message from the remote switching unit and, if there is such a message, to accomplish the appropriate system actions and to update the system memories in accordance with those actions. The time period of the 0 time slot is considerably longer than the time periods associated with the uninterrupted sequential scan of the individual time slots. This permits a number of actions to be accomplished during the 0 time slot while generally only a single action is performed in each time slot during each sequential scan. Often, in the course of the sequential scan of the time slots, the control unit will recognize that a number of work functions must be completed in the presently served time slot. For example, after call signaling has been completed in an intra-PBX call, the control unit will interrogate the line and trunk store to determine the service state, i.e., idle or busy, of the called extension. If the called extension is busy and is part of a hunting group of extensions, the control unit will examine the service states of the other extensions of the group to determine whether or not the call can be completed. In this and other situations the control unit will temporarily interrupt the time slot scanning cycle to provide sufficient time to complete the required actions. Although such interruptions increase the time between successive time slot scans, such time periods are still sufficiently short to permit all required system actions.

A data mesage from a switching unit to the control unit is a 13-bit serial message which comprises the following elements:

(1) Start (1 bit)
(2) Address (8 bits)
(3) Supervisory state of line, trunk, or key represented by address (1 bit)
(4) Common key designation (2 bits)
(5) Parity (1 bit)

The information in the data mesage must be correlated with information in the various memories of the control unit in order to determine the intent of the message and the action to be undertaken. The data message conveys all of the information available at the switching unit, i.e., the address of the line, trunk, or key to be served and its current supervisory state. Accordingly, identical data messages will require different actions by the control unit in accordance with the intent of the message as determined by the information in the various memories of the address of an extension and indicating that the extension is in an off-hook state may indicate a request for service, as indicated by the fact that the extension is not currently served by the control unit. The same message may indicate an answer as determined by the fact that the extension has been called and an answer is being awaited or may signal the terminal of a supervisory flash. Similarly, a data message giving the address of an extension and indicating that the extension is in the on-hook state may, for example, indicate a hangup or the start of a supervisory flash.

The control unit readily distinguishes between a request for service and an answer and between a hangup and a supervisory flash on the basis of the information in the various memories. The elements of information which are required in making these decisions are discussed in greater detail with respect to the detailed call through the system.

Calls handled by this switching system may originate from an extension, from an incoming trunk, or from an attendant's console and may also be destined for any one of the above three facilities. Although many of the actions taken by the control unit in handling the above types of calls, i.e., intra-PBX calls, incoming calls, outgoing calls, and operator calls, occur in all calls there are, however, differences in the sequences in which operations are performed and certain operations are performed in certain ones of these calls which are not performed in others of the calls. To provide a complete understanding of this invention these will be desrcibed herein:

(1) A detailed call through the system between a calling extension and a called trunk to the central office, (2) A request for additional service by one of the parties to an established talking connection and, specifically, a description of a request for a conference call. The steps taken in completing a conference connection are generally representative of the steps taken in completing an intra-PBX call, and (3) An attendant call between a calling extension and an attendant's console.

The description of the outgoing call from an extension to an outgoing trunk to the central office will be in greater detail than the description of the other calls through the system.

4. *Detailed call through the system*

The following discussion is directed to the actions required of the control unit in the processing of a single illustrative call through the system.

The control unit 100 receives its first knowledge of a call (an intra-PBX call, an outgoing PBX call, or an incoming PBX call) by means of the data receiver such as 602 or 1000. For example, assume that a call originates from No. 1 PBX extension 102 of switching unit No. 1 and that the call is to be directed, as subsequently indicated by the call signaling information which originates from extension 102, to a tie trunk such as 109. The scanner and last look memory circuits 416 and 417 are arranged to operate as a regular and standby scanner and last look memory circuit. That is, the scanner and last look memory circuit 416 may be operated as a regular scanner and its output transmitted to the control unit while the scanner and last look memory circuit 417 is held in reserve as a spare, or the situation may be reversed and the scanner and last look memory circuit 417 may become the regular circuit and the scanner and last look memory circuit 416 may become the standby circuit. In either event, both scanners maintain individual records of the last known supervisory states of the lines, trunks and attendant's circuits served by the switching unit and in the process of scanning these elements note any changes in supervisory state, either a change from on-hook to off-hook or from off-hook to on-hook. In our example, when the No. 1 PBX extension 102, which is associated with line 306 and line circuit 303, goes from the on-hook to the off-hook state, the scanner and last look memory circuits 416 and 417 both note the change from on-hook to off-hook and one of them, in this example the working scanner and last look memory circuit 416, passes a data message to the control unit 100 via the data send units 418 and the data send transmission path 121. The data message comprises a start bit, the eight address bits which define the No. 1 extension 102, and the supervisory bit which indicates the current supervisory state of the No. 1 extension to be off-hook and the parity bit which may be a 1 or a 0 in accordance with the rules of parity employed in the system.

The message concerning the request for service at extension No. 1 of switching unit No. 1 is received at the control unit 100 by the data receiver 602 over transmission path 121. The data message is received serially and when a complete message has been received, the message-complete output conductor 1013 of the data receiver 602 is enabled. Subsequently, when the control unit 100 directs its attention to the 0 time slot of switching unit No. 1, the message-complete signal will indicate that action must be taken by the control unit in accordance with the data message stored in the data receiver 602 and other information stored in the control unit.

In the event of an originating request for service, the control unit will undertake the following steps:

(1) By examination of the data message and the information in the memories of the control unit determine that a request for service has occurred.

(2) Find and assign an idle time slot to the request.

(3) Find and assign an idle signaling receiver to the request.

(4) Find and assign an idle signaling trunk to the request.

(5) Register the addresses of the signal receiver, the signaling trunk and the line or trunk requesting service in the call status store register 701 and subsequently insert this information in the call status store 700 in the assigned time slot location.

(6) Transmit a control message from the control unit to the switching unit No. 1 to order the establishment of a connection through the switching unit between the No. 1 extension 102 and the assigned signaling trunk such as 119.

(7) Transmit appropriate control information to the network control 511 to establish a connection through the network 509 between the assigned signaling trunk and the assigned signaling receiver.

(8) If, in the course of the above steps, one of the required elements, i.e., signaling trunk or signaling receiver is found to be unavailable, the control unit will advance the call progress mark to a waiting condition and in successive times of service to the assigned time slot, steps are taken to find an idle signal receiver or signaling trunk. If an idle time slot is not available, the content of the data message is discarded and subsequently the calling subscriber will hang up and reoriginate the call or will flash his switchboard and await dial tone.

The actions within the control unit relating to these various steps are described below.

5. *Detection of a service request*

The control unit directs its attention to the 0 time slot of the first switching unit when the switch unit number counter 703 has returned to the count of 1 and the time slot number counter 605 has returned to the count of 0. Under these conditions the call status store address translator 600 receives over conductor groups 606 and 702 the binary addresses of the 0 time slot and of switching unit No. 1, respectively. The information on conductor group 606 is gated under the control of a clock signal on conductor 612 through gates 607 and 603 to the input terminals of the translator 600. The call status store address translator 600 is enabled by a C2 clock signal on conductor 613. Under the above input address conditions the translator 600 provides an output signal on the 0–1 conductor to interrogate the call status store at the address of the 0 time slot of the first switching unit. In that the 0 time slot cannot be used to serve a call but, rather, is employed only to update the system information and to undertake action in accordance with data messages from the remote switching unit, the call progress word comprises only a unique word which is in the progress mark location and which is found only in the call status store at the 0 time slot information locations. The information in the call status store, in this case only the unique word in the progress mark location, is transferred from the call status store 700 to the call status store register 701. The information in the call status store register progress mark location is transmitted to the progress mark translator 1100 over conductor group 705. The unique progress mark of the 0 time slot indicates that the 0 time slot is being served and the progress mark translator must determine whether or not a complete message has been received in the data receiver associated with the switching unit under consideration. The message-complete signal is gated under control of the switch unit address translator through AND gate 614, conductor group 615, OR gate 1003, and conductor group 1004 to the message-complete input terminal of the progress mark translator 1100. The message-complete signal from the data receiver 602 to the progress mark translator 1100 is accompanied by a supervisory signal over the same path and this signal indicates the current supervisory state of the extension, trunk or attendant's trunk associated with the received message. The address portion of the message also appears as an input signal to the 8-bit binary to one-out-of-four translator 1024 which indicates to the progress mark translator the source of the data message. As previously set forth herein, for purposes of scanning the extensions are assigned the addresses 1 through 200, the transmission trunks are assigned the addresses 201 through 235, the maintenance circuits are assigned the addresses 236 through 243, and the attendants' loops are assigned the addresses 244 through 255. In accordance with the above-noted numbering plan, the progress mark translator receives a signal on one of the four conductors of cable 1025, namely, the conductors EXT, TRK, ATT, or MTCE. The progress mark translator under the above input signal conditions (namely, progress mark input signals indicating that the 0 time slot of a switching unit is being served, a message-complete signal and on off-hook supervisory signal along with an indication on the EXT conductor) provides an output signal on one of the progress mark translator output conductors M1 through MZ. Enablement of one of the conductors serves to enable an input terminal of the action translator and thereby provide action translator output command signals which are calculated to update the information in accordance with the external data message and to achieve the necessary system actions.

When the message-complete signal and the supervisory information are transmitted from the data receiver 602 to the progress mark translator 1100, the binary address of the line, trunk, or attendant's console noted in the data message is transmitted to the line and trunk information store register 805 to determine whether or not the subject line or trunk is currently served by the control unit. The address is transmitted from the data receivers 602 through AND gate 614, cable 615, OR gate 1003, cables 1005, 1006, and 1007, OR gate 1008, and cable 1009 to the register 805. The 8-bit binary address is one of the two input elements to the line, trunk and attendant's information store input translator 806. The other element of information required by the translator 806 is the switch unit address. This is derived from the switch unit number counter 703 and is transmitted via cable 706 to the input of translator 806. The translator 806 is enabled by an action translator signal on conductor 807. The translator 806, when enabled and addressed, energizes one of the output conductors 1 through Z to address the line, trunk and attendant's information store to the line, trunk or attendant's information location associated with the line or trunk noted in the data message. The information from the store 802 is transmitted to the register 800 and the service state (busy or idle) of the line or trunk, as indicated by the first bit in the register 800, is transmitted to the progress mark translator over conductor 808.

If the data message relates to a line or trunk which is currently served by the control unit, a time slot number will appear in the time slot portion of the register 800 and this information will be transmitted from the register 800 over cable 801, OR gate 818, cable 617, AND gate 604 and OR gate 603 to the call status store input translator 600. The switch unit number from which the data message originated is derived from the switch unit number counter 703 and transmitted to the translator 600 over cable 702. In that the 0 time slot is not an active time slot at the remote switching unit, the control unit in the event of a service request must find an idle time slot in which to serve the request for service, write the appropriate progress mark in the call status store memory at that time slot location, and place the binary address of the calling line in the line "A" information location of the call status store.

6. *Finding an idle time slot*

Figure 9:
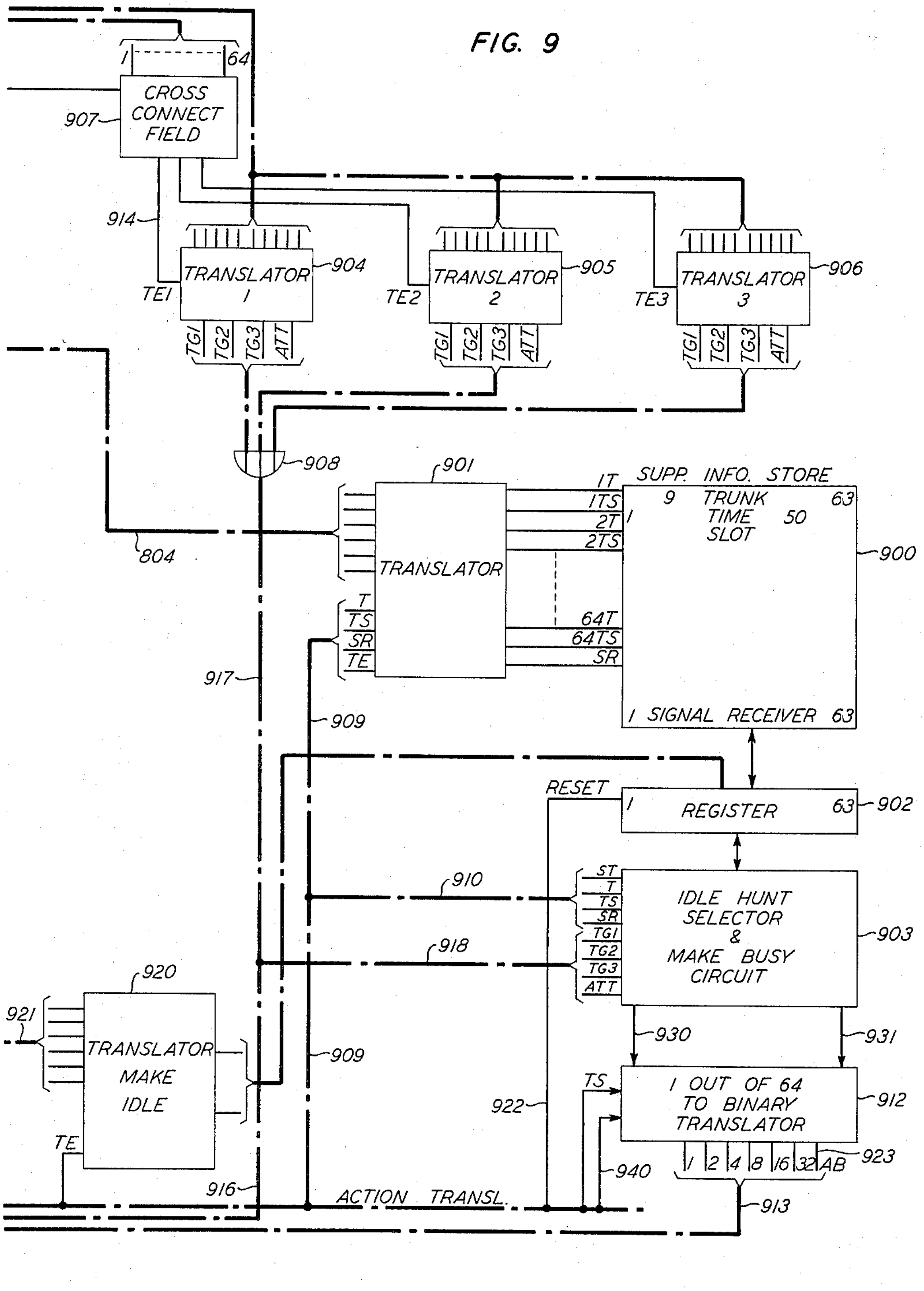
Figure 10:
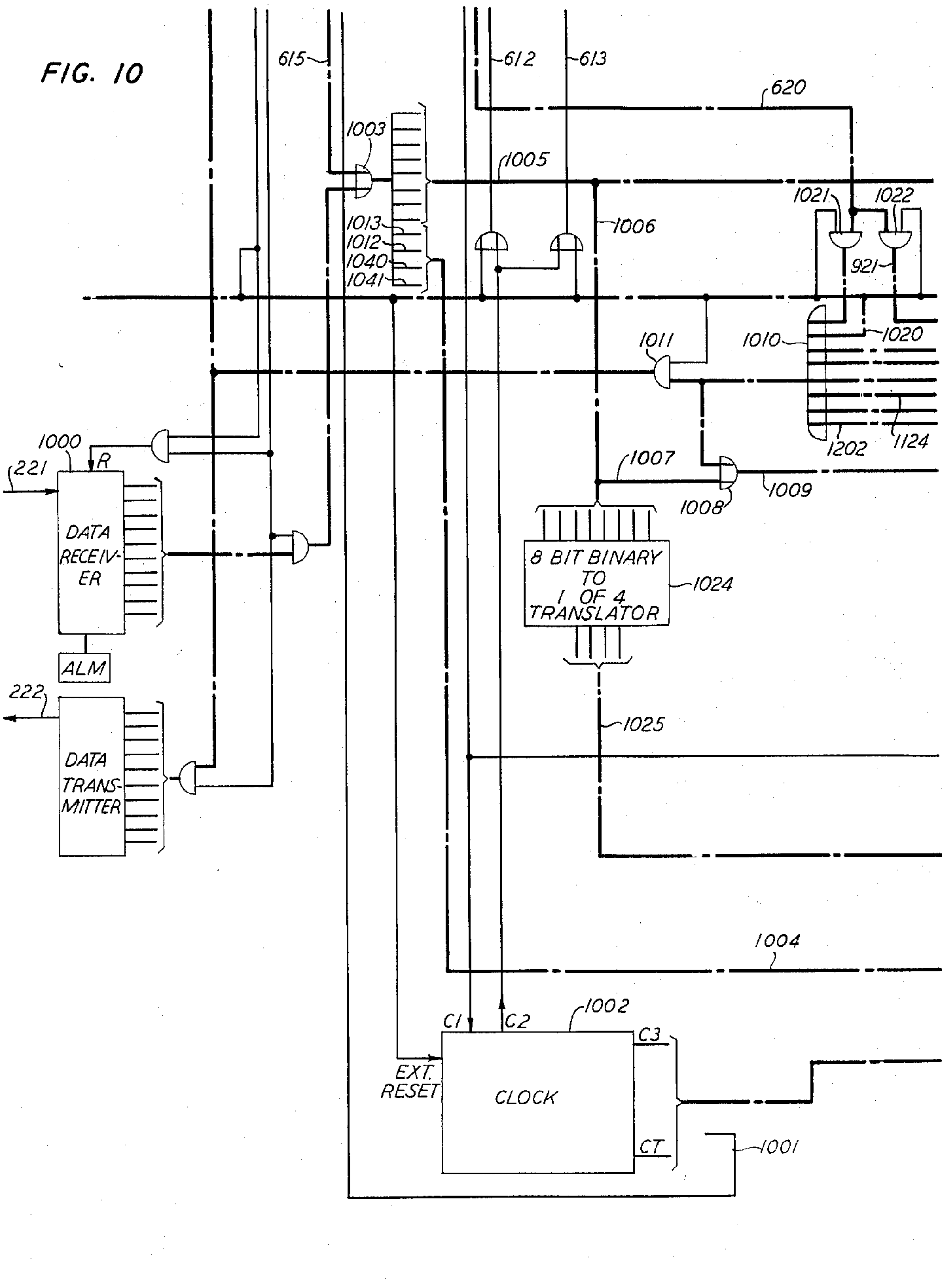
Figure 11:
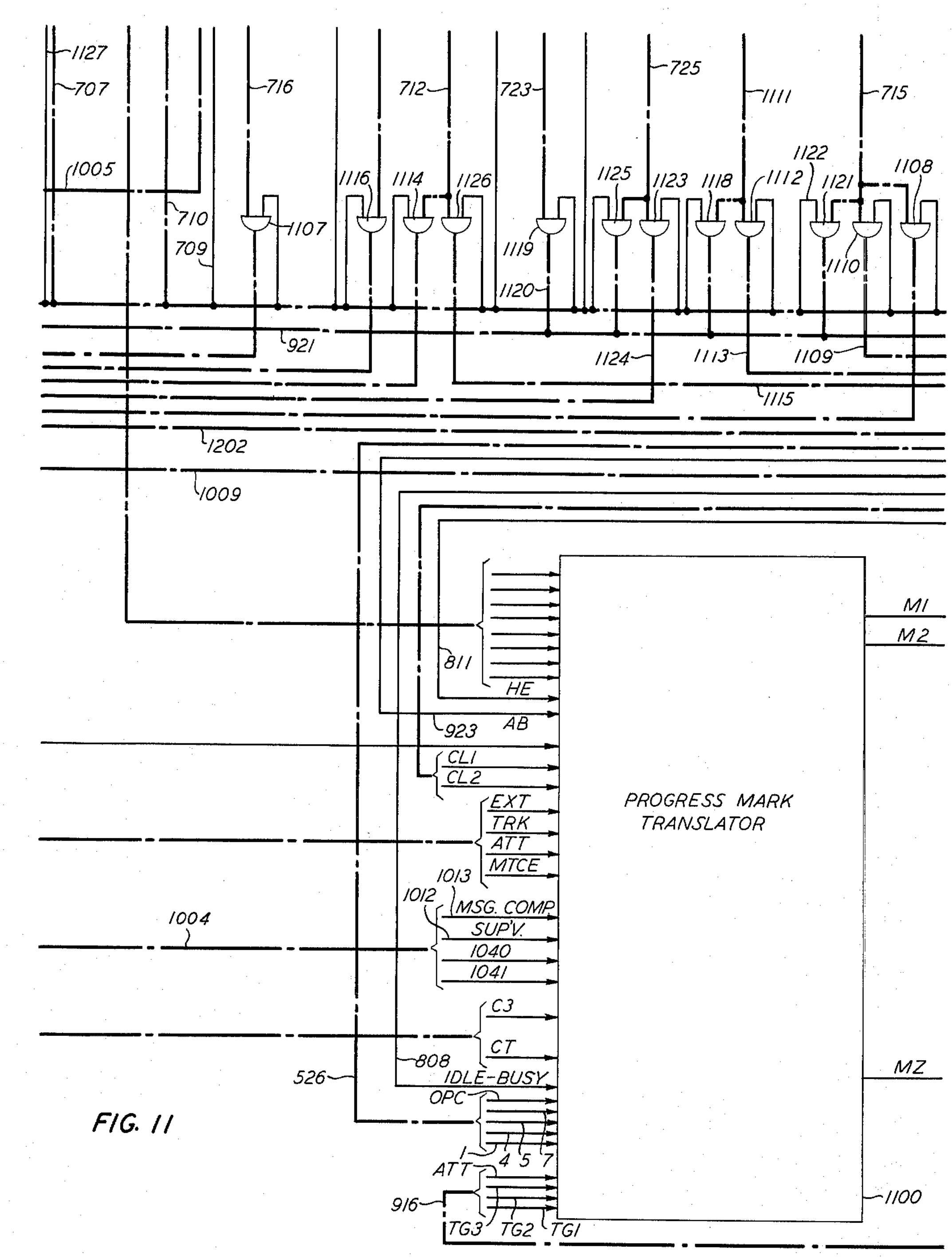

An idle time slot in a switching unit is determined by means of the idle-hunt selector and make-busy circuit 903. The idle-hunt selector and make-busy circuit 903 operates upon information which has been transferred from the supplementary store 900 to the supplementary information store register 902. This transfer of information is achieved by addressing the supplementary information store at the information location relating to the status of time slots in switching unit No. 1. In FIG. 9 the 1TS output conductor of the translator 901 is enabled to transfer the time slot availability information from the supplementary information store 900 to the supplementary information store register 902. The supplementary information store address translator 901 requires two classes of information. The first class of information comprises a 6-bit binary address which represents the number of the switching unit to which attention is directed and the second class is an action translator signal which indicates whether trunks, time slots or signal receivers are to be considered. In this illustrative example the TS conductor of cable 909 is enabled and the 6-bit binary address of switching unit No. 1 is transmitted from switch unit number generator 703 to the supplementary information store address translator 901 via cable 706, cable 803 and cable 804.

In FIG. 7 the numbering of the call status store input conductors 0–1 through 50–1 indicates that switching unit No. 1 is assigned fifty active time slots. Therefore, the idle-hunt selector and make-busy circuit 903 hunts to find the lowest numbered time slot which is not currently in use or assigned at switching unit No. 1. The idle-hunt selector and make-busy circuit 903 is advised that it is considering the availability of time slots by means of an action translator output signal over the TS conductor of cables 909 and 910. When an idle time slot is selected, it is made busy by writing a mark in the supplementary information store output register at the information location associated with the chosen time slot. The information in the supplementary information store output register 902 is then employed to update the time slot information in the supplementary information store 900. Further, an indication that a particular time slot is idle provides a one-out-of-fifty signal on conductors such as 930 and 931 to the one-out-of-sixty-four to binary translator 912. The one-out-of-sitxy-four to binary translator 912 provides 6-bit binary address signals on conductor group 913 to the input terminals of the call status store address translator 600. The remainder of the path for this address is OR gate 818, cable 617, input AND gate 604, OR gate 603, and input conductor group 601. The switch unit number as obtained from the switch unit number generator 703 is not changed at this time and the control unit will next serve the time slot which was previously idle and has now been seized to serve the call of the example. Prior to this time, however, the action translator over cable 707 transfers the information relating to time slot 0 of the first switching unit from the call status store output register 701 to the call status store at the time 0 information location in the call status store 700. After a time slot has been assigned, the address of the calling or "A" line is written in the call status store register 701 at the line "A" information location and the progress mark is changed to read "request for service." The binary address of the line requesting service is transmitted from the data receiver such as 602 via AND gate 614, cable 615, OR gate 1003, cable 1005, and AND gate 708 under control of an action translator signal on conductor 709. The appropriate progress mark is written in the progress mark location of the call status store register 701 by means of action translator signals on cable 710. Further, it is necessary to update the line and trunk information store 802 at this time to bring the temporary supervisory information in the line and trunk information store 802 into correspondence with the assignment of the requesting line to an operating time slot and to write the appropriate entry, i.e., off-hook in the supervisory bit location of the line and trunk information store 802 at the appropriate information location address, and the number of the time slot in which this call is being handled.

As previously noted, the line and trunk information store 802 was addressed to the information location provided for the extension noted in the data message and the information concerning this line was transferred to the line and trunk store register 800. The binary address of the time slot which is assigned to the request for service is transmitted from the one-out-of-sixty-four to binary translator 912 over cable 913, cable 849, OR gate 850, AND gate 827, and cable 809 to the time slot portion of the register 800. The supervisory bit of the line and trunk information in register 800 is changed to a 1 by means of an action translator signal on conductor 810.

7. *Assignment of a signal receiver*

After a line requesting service has been assigned a time slot, the control unit subsequently assigns a signal (or signaling) receiver such as 501 and 502 to the call to return dial tone to the calling extension and to recognize and register call signaling information from the calling extension. Assume, for purposes of this example, that the line requesting service in our example is assigned to time slot 10 of the first switching unit. After the time slot has been assigned and the appropriate word has been written in the call status store register 701, the progress mark translator will again be enabled to accomplish the assignment of a signaling receiver to the request for service. The progress mark word indicating a request for service will be transmitted from the register 701 via cable 705 to the progress mark translator 1100. In that the content of the data message is not required at this time, the supervisory signal on conductor 1012 and the message-complete signal on conductor 1013 will be ignored in accordance with the rule of action of the progress mark translator 1100. Similarly, the hunt-end signal on conductor 811 and all-busy signal on conductor 812 are ignored. Again, the progress mark translator 1100 in accepting an input progress mark representing a request for service, time slot assigned, and appropriate clock pulses on conductors C2 through C10 provides enablement of an appropriate one of the translator output conductors M1 through MZ to, in turn, provide action translator output signals of the action translator 1200 over cable 1201.

A connection must be established from a signaling trunk such as 119 or 120 through a switching network such as 509 to a signal receiver 501 and 502. Before an idle signal receiver can be assigned, an idle receiver must be detected by means of the idle-hunt selector and make-busy circuit 903.

As previously described, the signal receivers are employed in common by all of the switching units; therefore, information as to the availability of signal receivers is contained in a single line in the supplementary information store. In FIG. 9 it is seen that there is sufficient information capacity in the supplementary information store to handle sixty-three signal receivers. In that the signal receivers are employed by all switching units, the switch unit number input information to the translator 901 is unnecessary and enablement of the signal receiver conductor SR and the translator enable conductor TE is sufficient to transfer the signal receiver supervisory information from the supplementary information store 900 to the register 902. The idle-hunt selector and make-busy circuit 903 may then proceed to locate and identify the first idle signal receiver. The action of the idle-hunt selector and make-busy circuit 903 is initiated by enablement of the signal receiver SR conductor and the translator enable conductor TE. As in the case of the hunt for an idle time slot, the idle-hunt selector and make-busy circuit 903 provides an output signal on one of the sixty-three output conductors such as 930 and 931 and the one-out-of-sixty-four to binary translator 912, in turn, provides a 6-bit binary address on cable 913. The binary address thus established represents the identification of the signal receiver which is assigned to the request for service. Having found an idle signal receiver, the idle-hunt selector and make-busy circuit 903 changes the setting in the register 902 to show seizure of the idle receiver, and the information relating to signal receivers, corrected to show the seizure, is transferred back to the supplementary information store 900.

The binary address of the seized signal receiver is tranmitted over cable 913, AND gate 814 and cable 813 to the signal receiver section of the call status store register 701. It should be noted that the information in the call status store register 701 relates to time slot 10 of switching unit No. 1 and therefore relates to the request for service of this example.

After a signal receiver has been assigned to the line requesting service, the progress mark is updated to read "request for service, signal receiver assigned."

8. *Assignment of a signaling trunk*

After a signaling receiver has been assigned to the request for service, the control unit will take steps to assign a signaling trunk such as 119 and 120 to the request and effect connection of the line requesting service and the signaling receiver through the remote switching network and through the crossbar switching network 509 which is located at the control unit. Accordingly, the progress mark translator in interpreting the progress mark which says "request for service, signal receiver assigned" provides an output signal to the action translator 1200 to direct the idle-hunt selector and make-busy circuit 903 to hunt for an idle signaling trunk between switching unit No. 1 and the control unit. Accordingly, the translator 901 is addressed to read the supplementary information store 900 at the information location wherein the status of trunks within switching unit No. 1 is stored. That is, the translator 901 receives a 6-bit binary address from the switch unit generator 703 over cables 706, 803, and 804 and an action translator signal on the T conductor over cable 909. Thus, information relating to the availability of trunks within switching unit No. 1 is transmitted to the supplementary information store register 902 and the idle-hunt selector and make-busy circuit is enabled by an action translator signal on the ST conductor which signal orders the idle-hunt selector and make-busy circuit 903 to locate an idle signaling trunk. In response to these signals the idle-hunt selector and make-busy circuit 903 will again provide a one-out-of-sixty-three enabling signal on conductors such as 930 and 931 to the one-out-of-sixty-four to binary translator 912 and thereby provide a 6-bit binary number representative of the seized signaling trunk on cable 913. The action translator 1200 further provides an enabling signal on conductor 837 to enable AND gate 816 and thus passes the signaling trunk address to the signaling trunk information location in the call status store register 701. When this action is complete, the progress mark word will be updated to read "request for service, signaling receiver and signaling trunk assigned, connection to calling extension not completed."

9. *Establishing the signal receiver connection*

After the above described action has been completed and still within the time period of the 0 time slot, the call status word in the call status store register will at this ime comprise:

(1) A progress mark indicating the request for service with a signal receiver and a signal trunk assigned but connection not established.

(2) The line "A" location will carry the address of the line requesting service.

(3) The line "B" location, the trunk location and the attendants' locations will be free of information.

(4) The signal receiver location will contain the binary number representative of the signal receiver assigned to the request and the signaling trunk location will contain the binary number representative of the signaling trunk assigned to the request for service.

Under the influence of this call status word the progress mark translator will interpret the progress mark and provide action translator output signals which will cause the network control 511 to establish a connection between the assigned signaling trun and the assigned signal receiver 501 and will assemble a data message to be transmitted to switching unit No. 1 to order the establishment of a connection in time slot 10 between the calling extension 102 and the assigned signaling trunk, in our example trunk 119. The data message will comprise the following elements:

(1) Time slot number which is obtained from the line and trunk information store register 800.

(2) Line "A" number which is the identity of the calling line and which is obtained from the line "A" portion of the call status store register 701.

(3) The identity of the signaling trunk which has been assigned to the request for service and which is obtained from the signaling trunk portion of the call status store register 701.

(4) Start and parity bits.

The above message elements are all gated to the data transmitter 618 by action translator output signals. The complete path for the time slot number includes AND gate 1203, cable 1202, OR gate 1010, AND gate 1011 and AND gate 61. AND gates 1203 and 1011 are enabled by action translator signals and AND gate 619 is enabled by a switch unit number signal from the switch unit address translator 704. The line "A" number is transmitted through AND gate 1107 to OR gate 1010 and the remainder of the above described path and, similarly, the signaling trunk number is gated at the appropriate time through AND gate 1121 to OR gate 1010 an thus to data transmitter 618.

The data message is received at the switching unit over the data receive trunk 122 and is accepted by the data receivers 401 and 402. This information is compared in the transfer and alarm circuits 407 and, if the messages received in the two receivers do not agree, an alarm is sounded at the control unit as there is a question of the ability of the system to complete the call. Upon occurrence of an alarm condition at the switching unit, the transfer and alarm circuits insert an alarm message in the data send units 418 and 419 over conductor 420. The alarm message is decoded directly in the data receiver such as 602 and an alarm circuit such as 622 is enabled in response thereto. However, if there is agreement between the information in the two data receivers 401 and 402, the data distributor 405 will serve to transmit the received data message to the switch store 403 which is associated with the twenty-five even numbered time slots. Time slot 10, the one assigned to this request for service, is an even time slot and dictates the use of the data distributor 405. The switch store then serves in subsequent repetitive office cycles to establish a time division connection between the line 306 of the PBX extension No. 1 of switching unit No. 1 and a signaling trunk circuit such as 119.

At the control unit the action translator 1200 also provides signals to gate the appropriate addresses to the network control 511 to establish the desired connection between the signaling trunk 119 and the signal receiver 501 which is assigned to the particular request for service of our example. The network control 511 is enabled by an output signal of the translator 516, an action translator signal on conductor 517 and a signal receiver number on cable 518. The translator 516 accepts a 6-bit binary signal representative of the switching unit being served on cable 817 and a binary number representative of the signaling trunk assigned to the call on cable 1109. The switch unit number is transmitted from the switch unit number generator 703 and the signal trunk number is transmitted from the call status store register 701 through AND gate 1110.

The network control 511 receives the address of the signaling receiver assigned to the request for service over a path which includes cable 1111, AND gate 1112 and cables 1113 and 518. The network control with these input signals when enabled by an action translator signal on conductor 517 serves to establish a connection in the switching network 509 between the signaling trunk 119 and the signal receiver 501.

10. *Registration of call signaling information*

Dial tone is thus returned from the signal receiver 501 to the extension from which the request for service originated over the space division connection at the control unit, the signaling trunk 119 and the time division network at the remote switching unit. The subscriber at the extension requesting service may now proceed to register call signaling information representative of the desired destination of his call. As previously described, such call signaling information is in the form of multifrequency tones.

In response to the first digit of the call signaling information the signaling receiver such as 501 or 502 removes dial tone from the connection in a manner consistent with present day switching techniques.

A call originating with a PBX extension such as 102 may be an intraoffice call to another extension of the same switching unit, a call to another switching unit served by the same control unit 100, or a call to a distant switching center which is connected through the telephone central office 160. In a call to another extension of the same switching unit, the call signaling information which represents the directory number of the called extension and which is registered in the signaling receiver such as 501 is subsequently translated from, for example, a four digit directory number to an 8-bit binary code which defines the equipment number of the called extension. However, if the call is to another PBX or a switching center which is served through the telephone central office 160, the call signaling information which is registered in the signal receiver such as 501 is initially translated to permit seizure of an outgoing trunk which is associated with the office serving the called extension and, subsequently, the directory number of the called extension is retransmitted in the appropriate signaling form to the destination office.

The signaling connection between the calling extension 102 and the signal receiver 501 is by way of a time division connection at the PBX switching unit 101 and a space division connection through the switching network 509 at the control unit. This connection is maintained until after completion of the call signaling function has been detected by the control unit 100.

11. *Sequential service of time slots*

After the actions required in the 0 time slot have been completed, the control unit proceeds to sequentially serve the remaining time slots of the switching unit. In our example, the time slots 1 through 50 of switching unit No. 1 will be sequentially addressed and served and it should be noted that in our example one of the time slots, namely time slot 10 which was assigned to the originating request for service, will be served once at the beginning of the cycle during the 0 time slot interval and a second time during the normal sequential service. The control unit serves hundreds of lines and trunks and during each sequential consideration of a time slot, the control unit advances the progress of the calls served in relatively small increments.

12. *Evaluation of registered call signaling information*

As is the practice today, the initial digit or digits of call signaling information are employed to specify the general destination of a call. It is therefore possible to examine the first digit or digits, as the case may be, to determine whether the call is an intra-PBX call, a call to the attendant of the PBX, a call to the station served by the telephone central office 160 or a call to a station served by a different central office. In this example it is assumed that the first digit only specifies the general destination and the following table is by way of example only.

| First digit: | General destination |
|---|---|
| 0 | Attendant. |
| 1 | Special services. |
| 2–7 | Intra-PBX calls. |
| 8 | Calls to other PBX's of the company. |
| 9 | Calls to stations served by the central office **160** or stations of other offices served through central office **160**. |

If, in the sequential service of a time slot of a switching unit, the control unit finds a time slot (in our example time slot 10) in which a line which has requested service is connected to a signaling receiver such as 501 the control unit 100 will examine the information stored in the signaling receiver such as 501 to determine the general destination of the call. Each of the signal receivers such as 501 and 502 has associated therewith four conductors labeled 1, 3, 4, and 7 which are selectively enabled in accordance with the number of digits which have been registered in a signal receiver such as 501. This is, conductor 1 is enabled after one digit has been registered; conductor 3 is enabled after three digits have been registered; conductor 4 is enabled after four digits are registered; and conductor 7 is enabled after seven digits are registered following an initial 9. It is assumed for the purposes of this discussion that one digit defines the general destination of the call, i.e., attendant's call, intra-PBX call, call to another company PBX, or a call to a station served by the general telephone switching network; three digits fully specify an intra-PBX call; four digits fully specify a call to another PBX extension of the company, that is, a call via a tie trunk; and seven digits beyond an initial 9 fully specify calls which are completed through the general telephone switching network. Obviously this plan may be extended to handle ten digit nationwide calls.

Figure 5:
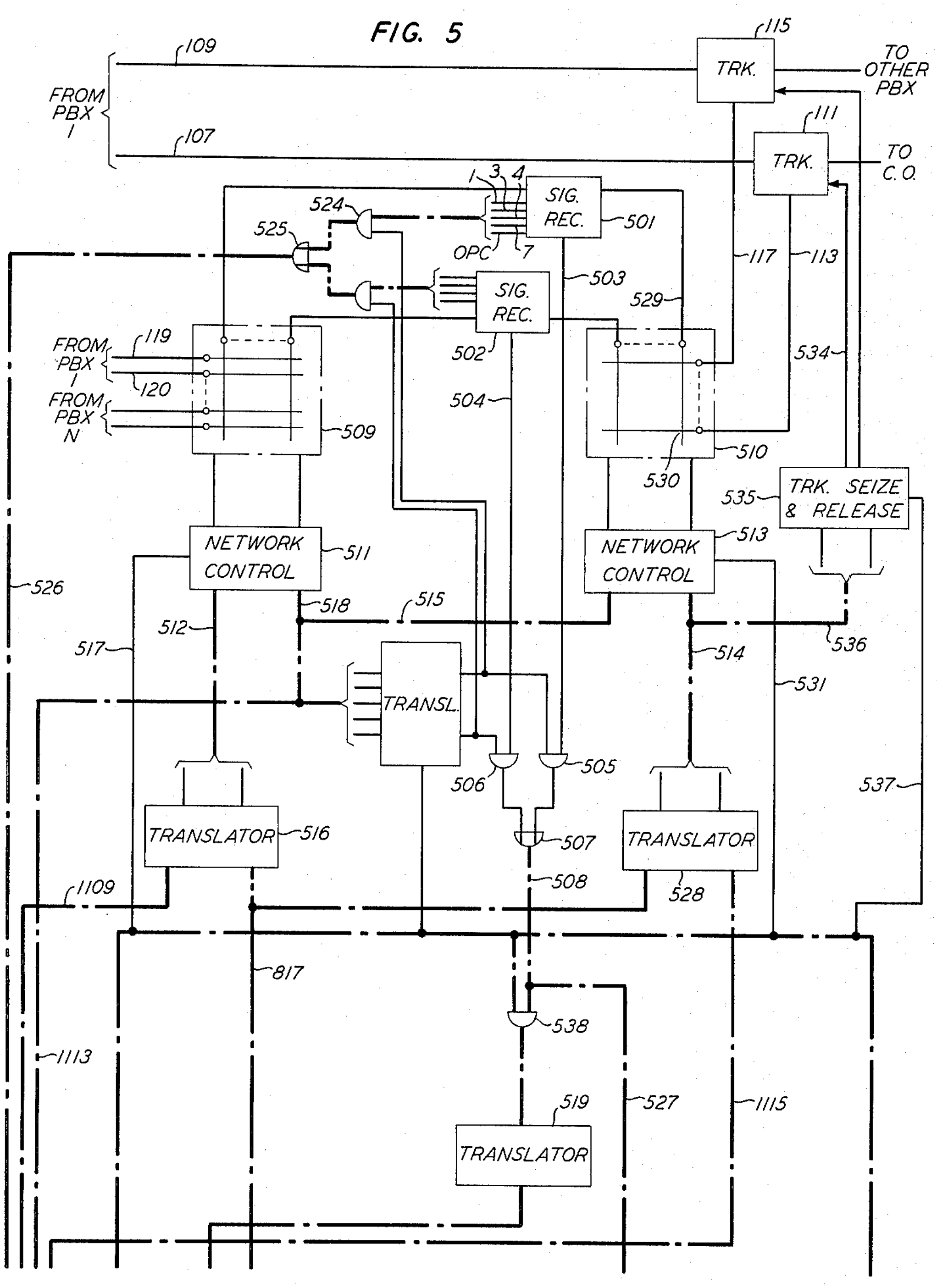
FIGS. 5 through 12 are a representation of the control unit in accordance with this invention.

In the sequential service of the time slots and, specifically, in our example in the sequential service of time slot 10 of the first switching unit, the control unit will determine from the progress mark that the line served in that time slot is connected to a signal receiver and will find that one or more digits have been registered in the assigned signal receiver 501. As shown in FIG. 5 the four conductors 1, 3, 4, 7 which indicate the number of digits registered are selectively gated through AND gate 524 and OR gate 525 and via cable 526 to the progress mark translator 1100. Accordingly, in the sequential service of the time slots it will be determined that the subscriber at extension 1 of switching unit No. 1 has registered at least one digit in the signal receiver 501. The digits registered in the signal receiver 501 are presented to the translator 904 which is assigned to switching unit No. 1 via the path which includes cable 503, AND gate 505, OR gate 507, cable 508, and cable 527. The translator 904 in response to the output signals representative of the registered digits from the signal receiver 501 and a signal on the TE1 conductor 914 will provide an output signal on one of the four output conductors ATT, TG1, TG2, or TG3. If the call is a 0 level call to the attendant, the ATT conductor will be enabled; if the call is an intra-PBX call as represented by the registration of one of the digits 2–7, the TG1 conductor will be enabled; if the call is to another company location as represented by the registration of the digit 8, the TG2 conductor will be enabled; and if the call is to a station served by the central office 160 or other offices reached through the central office 160, the TG3 conductor will be enabled. The translator output conductors are connected to the progress mark translator 1100 over a path which includes the OR gate 908, cable 917, and cable 916. The action taken by the control unit is dictated by the general destination of the call. If the call is to a trunk as indicated by the first digit being an 8 or a 9, the control unit will immediately search for an idle trunk to the required destination in preparation for the completion of registration of call signaling information which fully defines the destination of the call. However, if an interoffice call is indicated, the control unit awaits the registration of the three digits required to specify the called party. In this illustrative call it is assumed that the call is directed to a station served by the central office 160; however, later in the specification there will be a discussion which will also include an outline of the steps which would be taken if the call were in fact an intra-PBX call or a call to another company location.

13. *Assignment of a trunk*

In the example, the control unit finds in the sequential service that the line served in time slot 10 has completed registration of at least one digit as indicated by the enablement of the 1 conductor of cable 526 and has determined that the call is a ninth level outside call as indicated by a signal on the TG3 output conductor of translator 904. The progress mark translator 1100 under these input conditions, that is, a progress mark which indicates that the line served in the time slot is connected to a signal receiver; a signal on the signal receiver one digit received output conductor of conductor group 526 and a signal on the TG3 conductor of conductor group 916 will enable the appropriate one of the action translator input conductors M1 through MZ to accomplish the following results:

(1) Update the call progress mark in the call status store register 701 to indicate that the line served in the subject time slot is attached to a signal receiver and that it has been determined that a ninth level call has been originated.

(2) Order the idle-hunt selector and make-busy circuit 903 to find an idle trunk in the desired group, i.e., TG3.

(3) If an idle trunk is found, update the call progress mark in the call status store register 701 to indicate that the line served in the subject time slot has originated a ninth level call and that a trunk has been assigned to the call but is not yet attached.

In response to the new progress mark set forth in (1) above, the progress mark translator will address the supplementary information store address translator 901 to transfer information relating to the availability of the trunks of switching unit No. 1 from the supplementary information store 900 to the register 902. The address translator 901 of the supplementary information store 900 is addressed over cable 804 with a binary address representative of switching unit No. 1 from the switch unit number counter 703. In addition, an action translator signal on the T conductor of cable 909 will direct the attention of the translator 901 to the information store location which relates to the trunks assigned to switching unit No. 1. In response to these input signals the translator 901 in this example will energize the 1T input conductor to the supplementary information store to cause information relating to the trunks of switching unit No. 1 to be transferred to register 902.

At the same time the idle-hunt selector and make-busy circuit 903 is enabled with an action translator signal on the T conductor of cables 909 and 910 and a signal on the TG3 conductor of cable 918. Under these input conditions the idle-hunt and make-busy circuit 903 will examine the information in a restricted portion of register 902 and will find the first idle trunk in trunk group 3 and will seize the trunk by writing a busy indication in the appropriate location in register 902 and will provide an output signal on one of its output conductors such as 930 and 931 to the one-out-of-sixty-four to binary translator 912. The translator 912 thus provides a 6-bit binary address on cable 913 which is the binary address of the seized trunk.

After a trunk to serve the ninth level call has been found and seized, the following steps are taken:

(1) The address of the seized trunk is transmitted via cable 913, AND gate 830, and OR gate 711 to the trunk portion of the call status store register 701.

(2) The line and trunk information store 802 is updated to reflect seizure of the idle trunk, for example, trunk 107.

(3) The progress mark in register 701 is updated to reflect the assignment of a trunk to the call with the progress mark indicating that the registration of call signal information has not yet been completed.

(4) The trunk seize and release circuit 535 is directed to the seized trunk to transmit off-hook supervision to the distant office.

The idle-hunt selector and make-busy circuit 903 and the translator 912 are arranged to provide a first discrete signal on the AB conductor 923 if an idle line, trunk, signal receiver or time slot is available and a second discrete signal on the conductor 923 if a circuit element which is the subject of the current search is not available. Accordingly, after a trunk has been found, the AB conductor 923 is enabled with a first discrete signal which causes the progress mark translator to gate the address of the seized trunk to the call status store register 701 and to update the progress mark in the register 701.

After the number of the seized trunk has been placed in the trunk portion of the call status store register 701, this same trunk number is gated over a path which includes AND gate 1114, OR gate 1010, OR gate 1008, and cable 1009 to the address register 805 of the line and trunk information store 802. The line and trunk information store address translator 806 is at this time also addressed with the switch unit number address over cable 706. Under the influence of these input signals, namely, switch unit No. 1 and the address of central office trunk 107, the address translator 806 will read the line and trunk information store 802 at the information location associated with central office trunk 107 and thus transfer information relating to trunk 107 to the line and trunk information store register 800. The information in the register 800 is updated by an action translator signal on conductor 810 to show the new service state of trunk 107, i.e., assigned, and the time slot number is gated through AND gate 827 by an action translator signal on conductor 828. The time slot number is obtained from the time slot number counter 605 over a path which includes cable 606, cable 620, AND gate 1022, cable 921, OR gate 850, and AND gate 827. After the information in register 800 has been updated it is transferred back to the line and trunk information store 802 at the information location associated with the assigned central office trunk 107 and its associated trunk circuit 111.

Each trunk circuit such as 111 includes a bistable device such as a locking relay which operates and releases in response to signals from the trunk seize and release circuit 535. The purpose of the bistable device is to provide on-hook and off-hook supervision from the trunk circuit such as 111 to the distant office whether it be the central office or another PBX. The trunk seize and release circuit is directed to the appropriate trunk by an output signal of the translator 528 and the appropriate action to be taken, i.e., seize or release the trunk, is indicated by an action translator signal on conductor 537. The translator 528 is addressed with the switch unit number address from the switch unit number counter 703 over a path which includes cable 706, cable 803 and cable 817 and a trunk number address which is obtained from the trunk portion of the call status store over a path which includes cable 712, AND gate 1126 and cable 1115. Prior to the time that a talking connection has been established between the calling extension and the station at the distant office, off-hook supervision is maintained towards the central office until such time as the calling party releases. However, after a talking connection has been established, the off-hook supervision is maintained towards the central office until such time as either the converted extension or the distant office releases and the connection through the control unit is released.

If an idle trunk is not available, the control unit will merely return the information in the call status store register 701 to the appropriate location within the call status store 700. In subsequent office timing cycles when time slot 10 of switching unit No. 1 is served, further attempts will be made to find an idle trunk in trunk group 3. It is desirable to assign a trunk to a call as soon as the destination of the call has been determined. However, assignment of a trunk may be made any time prior to the completion of registration of call signaling information in the signal receiver 501. If at the time the registration of the call signaling information has been completed as indicated by enablement of the 7 conductor of signal receiver 501 and if an idle trunk has not been found, the control unit formulates a data message to release the connection between the calling extension and the signaling trunk and returns reorder tone to the calling party who must hang up and again originate a call.

14. *Completion of registration of call signaling information*

At a time of a subsequent sequential service of time slot 10 of switching unit No. 1 the control unit will recognize through the input signals to the progress mark translator 1100 that the line served in that time slot has initiated call signaling information which indicates a ninth level call and a signal on the seven digit dialed conductor 7 of the signal receiver 501 will indicate that all seven digits required to define an outgoing call have been registered. Assuming that an idle trunk was found and seized prior to this time, the control unit is now prepared to release the connection between the calling extension 102 and the signaling trunk 119 at the switching unit and to establish in place thereof a time division connection between the calling extension 102 and the assigned central office trunk, in this example trunk 107. Further, the control unit also releases the connection through the switching network 509 between the signaling trunk 119 and the signal receiver 501 and establishes a connection through the switching network 510 between the signal receiver 501 and the assigned central office trunk 107. The path between the signal receiver 501 and the trunk circuit 111 is employed to transmit from the signal receiver to the distant central office the call signaling information which has been registered in the signal receiver 501. Outpulsing or transmission of the call signaling information from the signal receiver 501 awaits a signal from the central office which indicates that the central office is prepared to accept call signaling information.

The connection between the signaling trunk 119 and the signal receiver 501 through switching network 509 is released by addressing the network control 511 with the address of the signal receiver 501 over a path which includes cable 1111, AND gate 1112, cable 1113, and cable 518 along with an action translator release signal on conductor 517.

The connection through the switching network 510 is established under action translator control by addressing the network control 513 with the address of the signal receiver 501 in parallel with the addressing of the network control 511 and by addressing the network control 513 with the address of the trunk circuit 111 which is associated with the trunk 107. The address of the trunk circuit is obtained by addressing the translator 528 with the switch unit number as obtained from the switch unit number counter 703 over a path which includes cable 706 and cable 817 and with the trunk number within the switching unit as obtained from the trunk portion of the call status store register 701 over a path which includes cable 712, AND gate 1126, and cable 1115. In response to the above described input signals the network control 513 will establish a connection through switching network 510 between signal receiver 501 and the trunk circuit 111 of trunk 107.

The control unit formulates a data message to be transmitted from the control unit to switching unit No. 1 to order the establishment of a connection at the switching unit between extension 102 and the central office trunk 107. The data message will comprise the time slot number, the address of the calling extension 102 and the address of the trunk 107 which is assigned to the call along with start and parity bits. The data message is assembled in the data transmitter 618 as follows:

(1) The time slot number is obtained from the time slot number counter 605 and is gated by the action translator to the data transmitter 618 over a path which includes cable 606, cable 620, AND gate 1021, OR gate 1010, AND gate 1011, and AND gate 619.

(2) The line "A" address is obtained from the line "A" location of the call status store register 701 again under action translator control over a path which includes cable 716, AND gate 1107, OR gate 1010, AND gate 1011, and AND gate 619.

(3) The address of the trunk is similarly transmitted under action translator control from the trunk portion of the call status store register 701 over a path which includes cable 712, AND gate 1114, OR gate 1010, AND gate 1011 and AND gate 619.

After the data message has been assembled and transmitted from the control unit to the switching unit, the action translator updates the progress mark in the call status store register 701 to reflect the establishment of the connections at the switch unit and at the control unit as described hereinabove and to reflect the connection through switching network 510 between the signal receiver 501 and the trunk circuit 111.

The data message is received at the switching unit by the data receivers 401 and 402 and then distributed by data distributor 405 which serves the even numbered time slots. The data distributor 405 places the received message in the switch store 403 at the information location associated with the assigned time slot 10 to effect establishment of a connection between the line circuit 303 of PBX extension 1 and the central office trunk 107 which is associated with trunk circuit 111 at the control unit. When this message is placed in the switch store 403, the priorly established connection between the line circuit 303 and the signaling trunk 119 is destroyed thereby releasing the signaling trunk at the switching unit.

After the signaling trunk is physically released at the control unit and at the switching unit, the supplementary information store 900 is updated to reflect the change from the busy to the idle state of the released signaling trunk. To update the supplementary information store 900 the translator 901 is addressed over cable 804 with the binary address of the switch unit being served, in this case switch unit No. 1, and an action translator signal over cable 909 and, specifically, the T conductor to address the supplementary information store at the information location relating to the trunks of switching unit No. 1. In addressing the translator 901 the supplementary information store 900 is read at the appropriate place and its contents are transmitted to the supplementary information store register 902. The information in the register 902 is updated in accordance with information from the make-idle translator 920. The make-idle translator 920 receives over cable 921 the binary address of the signaling trunk to be made idle. This information is transmitted from the signaling trunk portion of the call status store register 701 through AND gate 721 under control of an action translator signal on conductor 722. The information in the register 902 is read back into the supplementary information store at the appropriate location and thus the record in the supplementary information store reflects the release of the signaling trunk.

15. *Release of the signaling receiver*

The signaling receiver 501 remains connected to the trunk 111 to the central office through the switching network 510 until after the call signaling information registered in the signal receiver 501 is transmitted to the central office as indicated by a signal on the outpulsing completed conductor OPC.

Subsequently, in the course of serving time slot 10 of switching unit No. 1, the control unit will determine by interpretation of the call progress mark and an outpulsing completed signal on the OPC conductor that the signaling receiver may be released. At this time the call progress mark in time slot 10 of switching unit No. 1 is updated to indicate that a connection has been established between a calling extension, in our example extension No. 1, and the central office, that outpulsing has been completed and an answer from the central office is awaited. The signaling receiver is released by addressing the network control address translator 528 over cable 1115 with the address of the trunk to which the signal receiver to be released is connected. The binary address of the trunk, in our example trunk 107 which is associated with trunk circuit 111, is transmitted from the trunk portion of the call status store register 701 via cable 712, AND gate 1126, and cable 1115 to the address translator 528. The translator 528 provides an input signal to the network control 513 which directs the network control to the connection between the trunk 111 and the signal receiver 501. The translator output signal in conjunction with an action translator release signal on conductor 531 causes the network control 513 to release the connection within the network 510 between the signal receiver 501 and the trunk circuit 111 via conductor group 113.

When the signal receiver 501 has been physically released at the control unit, the make-idle translator 920 is addressed over cable 921 with the binary address of the signaling receiver which is to be released. The signal receiver address is transmitted from the call status store register 701 via cable 1111, AND gate 1118, and cable 921. The make-idle translator is enabled by an action translator signal on the TE conductor. The make-idle translator, accordingly, addresses the supplementary information store register 902 at the apprropriate information location to make the released signal receiver appear idle. The information relating to signaling receivers was priorly transmitted from the supplementary information store 900 under an action translator signal and the SR conductor of cable 909 and after the register 902 has been updated, the information is read back to the signal receiver information location of the supplementary information store 900.

During subsequent service of time slot 10 of switching unit No. 1, one of two events will occur: (1) either an off-hook supervisory signal will be returned from the central office and will be noted at switching unit No. 1; or (2) in the event that an answer is not forthcoming, the subscriber at extension No. 1 will hang up and this will be noted. In either event, i.e., an answer at the distant office or a hangup at the origating extension will result in a data message from the switching unit to the control unit and the next service of this call will occur in a 0 time slot.

If an answer occurs at the distant end of the central office trunk, the only action required at the control unit is the updating of the progress mark in the call status store to indicate that a talking connection has been established.

When the call is answered, the scanner and last look memory circuits at the switching unit will detect the supervisory transition of the trunk from on-hook to off-hook and will formulate a data message to be transmitted from the switching unit to the control unit. The data message will include the address of the trunk which has answered and a supervisory bit which indicates that the trunk is in the off-hook state. As in the case of all other data messages, this message will be served in the 0 time slot of switching unit No. 1 and the control unit upon receipt of a complete message will, through action translator signals, address the line and trunk information store 802 at the information location associated with the trunk whose address was included in the data message. The information in the line and trunk information store 802 will be read to the register 800 and with the time slot portion of this information the control unit will interrogate the call status store 700 at the information location associated with the time slot number thus obtained. The control unit under the influence of the call progress mark which indicates that a call has been established and that an answer is awaited and the data message which indicates that the trunk is in the off-hook state will determine that the call has been answered and will update the progress mark associated with the call to indicate that the talking condition exists and will then return the call status word to the call status store 700.

16. *Abandonment of the call before answer*

In the event that an answer is not forthcoming from the distant station and the subscriber at PBX extension 1 hangs up to cancel the call, more extensive actions are required by the control unit as follows:

(1) Formulate a data message from the control unit 100 to the switching unit to effect release of the connection between extension 1 and the trunk 111.

(2) Address the make-idle translator to the information location relating to the released trunk to make the trunk appear idle.

(3) Address the line, trunk and attendant's information store 802 at the appropriate location to make PBX extension 1 of switching unit No. 1 idle and available to accept calls or to originate calls.

(4) Address the line, trunk and attendant's information store 802 at the appropriate location to make the trunk 111 of switching unit No. 1 idle and available to accept calls or to originate calls.

(5) Release time slot 10 of switching unit No. 1 by erasing the information in the call status store relating to time slot 10.

(6) Release the central office equipment at the distant end of the trunk by resetting the trunk circuit 111 to remove the off-hook supervisory signal from the trunk circuit 111 to the central office.

If the call is not answered and the subscriber hangs up, or if for some other reason the calling subscriber hangs up before the call is answered, a data message will originate at switching unit No. 1 and will thereby notify the control unit that extension 1 of switching unit No. 1 was in the off-hook state and is now in the on-hook state. During the 0 time slot of switching unit No. 1, the control unit will recognize the registration of such a message in the data receiver 602 and this message will be interpreted by the control unit to determine the steps which it should undertake in accordance with this external stimulus. A data message wherein the subject line, trunk or attendant's console is in the on-hook supervisory state must of necessity relate to a line, trunk, or attendant's console which is currently served by the control unit. Such a data message relating to a line, trunk, or attendant's console not currently served by the control unit would have no useful significance and when found is discarded. As previously described, when a request for service cannot be served due to the unavailability of a time slot, the data message indicating the transition from on-hook to off-hook is ignored. Consequently, when the subscriber at the requesting extension hangs up in preparation for again trying to originate a call, a data message will be generated which indicates a transition from off-hook to on-hook. In that the prior message was discarded due to the unavailability of a time slot to serve the request, the latter message will relate to an extension not served by a time slot and therefore such a message is of no useful significance and may be ignored.

The data message which comprises the address of the line, trunk, or attendant's console which has changed its supervisory state and the signal which indicates the current supervisory state of the subject line, trunk, or attendant's console is gated from the data receiver 602 through AND gate 614 to the cable 615. AND gate 614, as in prior discussions, is enabled by an output signal from the switch unit address translator 704. In addition to the above-noted information there is also present in cable 615 the message-complete conductor 1013. The message-complete conductor 1013 and the supervisory state conductor 1012 are connected to the input of the progress mark translator 1100 and the address conductors of cable 1005 are connected to a variety of destinations. The address of the subject line, trunk, or attendant's console is transmitted via cables 1005, 1006, and 1007, OR gate 1008 and cable 1009 to the address register 805 of the line and trunk information store 802. This address which is stored in the register 805 is applied to the translator 806 along with a binary number which is representative of the switch unit being currently served, in this example switch unit No. 1. In response to these two binary addresses the translator 806 provides an output signal to address the line and trunk information store 802 at the information location relating to the line, trunk, or attendant's console noted in the data message. The information in the line and trunk information store is thus read to the register 800. The time slot information which is obtained from the line and trunk information store 802 is transmitted via cable 801, OR gate 818, cable 617, AND gate 604, OR gate 603, and cable 601 to the call status store address translator 600. The call status store address translator 600 is also addressed with the binary number representative of the switch unit currently served and this address is transmitted via cable 702. The output signal of the call status store address translator 600 thus interrogates the call status store 700 at the information location of the time slot wherein the subject line, trunk, or attendant's console is served. In our example, the binary address of the time slot 10 is read from the line and trunk information store 802 to the register 800 and thus transmitted over cable 801 to the address translator 600 to effect interrogation of the call status store at time slot 10 of switching unit No. 1.

The control unit is now prepared to interpret and act upon the data message. The progress mark translator 1100 at this time receives the following input signals:

(1) The binary number representative of the progress mark which indicates that a call has been established and that answer by the called party is being awaited.

(2) There is a message-complete signal on conductor 1013, and there is an on-hook signal on the supervisory conductor 1012.

(3) There is a signal on the extension conductor EXT which indicates that the data message relates to an extension of switching unit No. 1 as opposed to a trunk, an attendant's console, or a maintenance item.

The progress mark translator in response to these input signals generates an output signal which causes the action translator to accomplish the following results:

(1) Generate a data message from the control unit to switching unit No. 1 to release the connection between PBX extension 1 and the trunk 107.

(2) Direct the make-idle translator 920 to the appropriate information location of the supplementary information store to release the trunk 107 and thereby make it available for subsequent assignment.

(3) Update the line and trunk information store at the information location associated with extension 1 of switching unit No. 1 to remove the time slot assignment and to update the service state bit to indicate that the extension is now free to accept or originate traffic.

(4) Clear the call status store at the time slot 10 information location of switching unit No. 1 to release time slot 10 and make it available for future assignment.

The data message from the control unit to the switching unit will comprise:

(1) The time slot number which is obtained from the line and trunk information store register 800 and is transmitted to the data transmitter over a path which includes cable 801, AND gate 1203, cable 1202, OR gate 1010, AND gate 1011, and AND gate 619.

(2) In place of the binary signals which represent the calling and called lines in the data control message employed in establishing a connection, the action translator over cable 1020 will place in the data message two binary addresses, for example 0, which may be identical and which are not assigned to a line, trunk, or attendant's console in the switching unit. Accordingly, when this number is written in the switch store, the time slot is in fact idle as none of the line or trunk gates will respond to this number.

The make-idle translator 920 is addressed under the control of the action translator with the number of the trunk, in this example trunk 107, which is to be released. The trunk number is transmitted via cable 723, AND gate 1119, cable 1120, and cable 921. Prior to enablement of the make-idle translator 920 by an action translator signal on the TE conductor, the information relating to the trunks of switching unit No. 1 is read from the supplementary information store 900 to the register 902. This transfer of information to the register 902 is achieved by addressing the supplementary information store address translator 901 with the switch unit address from the switch unit number generator 703 over a path which includes cable 706, cable 803, cable 804, and a signal on the trunk conductor of cable 909, this latter signal originates in the action translator 1200. After the information is in the register 902, the make-idle translator 920 is enabled and the specified cell of the register 902 is changed from the 1 to 0 state to release the trunk 107. The information in the register as thus modified is read back to the supplementary information store under an action translator signal on conductor 922.

The line and trunk information store address translator 806 is addressed with the switch unit number address over cable 706 and the address of extension 1 of switching unit No. 1 over a path which includes cable 716, AND gate 1107, OR gate 1010, OR gate 1008, and cable 1009. The information relating to extension 1 of switching unit No. 1 is thus transferred to the register 800 and an action translator signal over cable 822 resets the time slot and service state portions of the register and, subsequently, the information in the register 800 thus updated is transferred back to the store 802 under an action translator signal on conductor 823. The line and trunk information store address translator 806 is immediately readdressed with the switch unit number address over cable 706 and the address of trunk 111 of switching unit No. 1 over a path which includes cable 712, AND gate 1114, OR gate 1010, OR gate 1008, and cable 1009. The information relating to trunk 111 of switching unit No. 1 is thus transferred to the register 800 and an action translator signal over cable 822 resets the time slot and service state portions of the register and, subsequently, the information in the register 800 thus updated is transferred back to the store 802 under an action translator signal on conductor 823.

At the time that the trunk circuit 111 was seized, an off-hook supervisory signal was transmitted from the trunk circuit to the distant central office. The trunk circuit 111 is returned to the on-hook state by a release signal from the trunk release circuit 535 on conductor 534. The trunk release circuit 535 is addressed by an output signal of the translator 528 on cables 514 and 536 and is enabled by an action translator signal on conductor 537. The translator 528 is addressed with the switch unit number counter 703 over cables 706, 803, and 817 and with the trunk number address from the trunk portion of the call status store register 701 over cable 1115. In response to these input signals the translator 528 enables one of its output conductors which are associated individually with the trunks such as 111 and 115.

Having completed the above actions, the call status store register 701 is reset by signals over cable 707 and the information in the register is transferred back to the call status store 700 to clear the information location of time slot 10.

17. *Detection of a switchhook flash or a release request*

After a talking connection has been established, the subscribers at the originating and terminating ends may:

(1) Request a release of the connection and the release request may originate from either end, or (2) Either subscriber may wish to request a further service and will accomplish this by means of a switchhook flash.

An example of the service which may be requested after a switchhook flash is a conference connection. Changes in supervisory state associated with a release request or a switchhook flash will be detected at the switching unit by means of the scanner and last look memory circuit 416 or 417 and the control unit will receive knowledge of these actions by means of a data message which must be interpreted to differentiate between a release and an additional service request. The control unit upon receiving an indication that a line or trunk which is in the talking condition has gone from off-hook to on-hook initiates a timing sequence to distinguish between a release and a switchhook flash. That is, when a data message is received which indicates that a line which is found to be in the talking condition is now in the on-hook state, the control unit updates the progress mark relating to the call to indicate that an extension or a trunk which was in the talking state has now gone on-hook. Subsequently, during the sequential service of the time slots, the progress mark translator and the action translator will advance this call progress mark through a number of steps which correspond to a timing sequence. If the progress mark is advanced through its complete timing cycle which is of sufficient time duration to assure that the on-hook period of a switchhook flash has passed, the control unit interprets the data message as a release request and undertakes action at the switching unit and at the control unit to release the connections and to return the requesting extension or trunk to the idle state. Only the extension or trunk requesting release is returned to the idle state in the control unit memories and the other party or parties to the connection must also hang up before the time slot is released and the remaining extension or trunk returned to the idle state in the control unit memories.

The control unit proceeds generally as set forth previously herein under the heading "Abandonment of Call Before Answer," however, with the specific exception that only the extension or trunk requesting release is returned to the idle state in the memories and the time slot is not released. That is, the control unit takes steps to release the connection at the switching unit and will update the memories at the control unit to reflect the release of the requesting element of the connection. If the release request originates with an extension, the line and trunk information store 802 will be updated to show an idle service state and to remove the time slot assignment. However, if the request originates with a trunk, both the line and trunk information store 802 and the supplementary information store 900 will be updated to show the release of the trunk. Further, if the release request originates with a trunk, the control unit will also address the trunk circuit such as 111 through the trunk release circuit 535 to release the distant equipment by removing the off-hook supervisory signal. These actions will not at this time again be described in detail.

In the event of a switchhook flash, a second data message will be transmitted from the switching unit to the control unit before the timing cycle has been completed and this data message will indicate that the extension or trunk which was previously noted to be in the on-hook state has now returned to the off-hook state. Receipt of such a message prior to time-out is interpreted by the control unit as a request for additional service.

The data message which indicates a termination of a switchhook flash will be interpreted in a 0 time slot of the switching unit. The address portion of the data message will be employed in conjunction with the switch unit number from the switch unit number generator 703 to address the line and trunk information store 802 and the information concerning the line, trunk, or attendant's trunk which is the subject of the data message will be read to the register 800. In the case of a switchhook flash, a time slot will have been previously assigned and the number of this time slot is read from the register 800 via cable 801, OR gate 818, cable 617, AND gate 604, OR gate 603, and cable 601 to the call status store address translator 600. The information at the addressed time slot of the call status store 700 is transmitted to the call status store register 701. The progress mark translator 1100 interprets the progress mark and the data message to indicate the termination of a switchhook flash and, therefore, a request for additional service. The action translator updates the progress mark to indicate a request for additional service and the following other actions are undertaken:

(1) Direct the idle-hunt selector and make-busy circuit to find an idle signaling receiver.

(2) Direct the idle-hunt selector and make-busy circuit to find an idle signaling trunk.

(3) Update the progress mark again to indicate a request for additional service with a signaling trunk and a signaling receiver assigned to the request.

(4) Generate a data message to be transmitted from the control unit to the switching unit to release the connection between line "A" and line "B" or between line "A" and a trunk in the presently assigned time slot and to order a connection between line "A," that is, the line requesting the additional service and the signaling trunk which has been assigned to the request.

(5) Establish a connection through the switching network 509 at the control unit between the assigned signaling trunk and the assigned signaling receiver.

(6) Transfer the information in the register 701 back to the assigned time slot in the call status store 700.

The above actions are accomplished generally as previously set forth herein with regard to an originating request for service from an extension.

When a signaling receiver becomes attached to the line requesting the additional service, dial tone will be returned to the requesting subscriber who may now proceed to register the call signaling information relating to the additional request. The control unit, as in the case of an originating request for service, will note the registration of information in the assigned signal receiver, for example in signal receiver 501, by means of signals on the digits registered conductors 1, 3, 4, and 7. If, for example, the request is for a conference call to include another extension of the switching unit, the control unit will await registration of three digits in the signaling receiver 501 before undertaking further action with respect to the call. In the sequential service of the time slots the control unit will in due time note that three digits have been registered in the signaling receiver 501 and this information, in conjunction with the progress mark which has been read from the call status store register 701, will cause the progress mark translator to undertake steps to establish a conference call between the extension indicated in the registered call signaling information and the original parties to the connection. It should be noted that the original parties to the connection are indicated in the line "A" and line "B" positions or the line "A" and trunk positions on the line "A" and attendants' consoles of the call status store register 701. If the original connection was between two extensions, the first applies; if the original connection was between an extension and a trunk, the second applies; and if between an extension and an attendant, the last applies. In any event, the new call progress mark will indicate the original parties to the connection. The progress mark translator upon noting a progress mark which indicates a request for additional service with a signaling receiver and a signaling trunk assigned along with an indication that three digits have been registered in the assigned signaling receiver will interpret this information to be a request for a conference call and in response thereto the control unit will undertake action to accomplish the following:

(1) Direct the idle-hunt selector and make-busy circuit to find a pair of idle time slots in which a conference call may be served. If a pair of idle time slots is not available, a data message is generated to connect reorder tone to the requesting subscriber. As previously explained, a two piece 6-bit binary code is employed to identify the time slots in the system. Time slots which occur at the same point in time on the two links at a switching unit bear the same 5-bit binary number with the sixth bit being a 0 for the first link and a 1 for the second link. For example, time slot 13 of link 1 has the address of 10111 0 its corresponding time slot for the second link has the binary address 10111 1. These addresses define word locations within the call status store 700. Therefore, it is possible to shift attention in the call status store from one of a pair of time slots to the other of a pair of time slots by merely changing the sixth bit from a 1 to a 0 or a 0 to a 1 as the case may require.

(2) Having found a pair of idle time slots, the time slot in which the original connection was established and, subsequently, the connection between the requesting line and the signaling trunk was established may now be released. Therefore, the control unit generates a data message to be transmitted from the control unit to the switching unit to release the original time slot.

(3) After a pair of idle time slots have been found and the original time slot released, the control unit addresses the call status store at the information location of the first time slot of the idle pair. In this particular instance, the translator 600 is addressed with the switch unit number which is derived from the switch unit number generator 703; however, the information at the thus defined information location in the call status store 700 is not read to the call status store register 701 in order to preserve the information in the register 701.

(4) Also, having found a pair of idle time slots, the line and trunk information store 802 is updated at the information locations which are associated with the original connection as reflected by the information in the call status store register 701. That is, the line and trunk information store 802 is first addressed to the information location associated with the extension whose binary address is found in the line "A" location of the register 701 and then, subsequently, the line and trunk information store 802 is addressed at the information location associated with the second party to the original connection as determined either from the line "B" location of the register 701 or from the trunk location of the register 701. In both cases the line and trunk information store address translator 806 is addressed with the switch unit number which is obtained from the switch unit number counter 703 and with the appropriate extension or trunk address which is obtained from the call status store register 701. In the case of the line "A" location of the register 701, the information is read to the address register 805 over a path which includes cable 716, AND gate 1107, OR gate 1010, OR gate 1008 and cable 1009. Similarly, an extension whose number is obtained from the line "B" location of the register 701 is transmitted from the register 805 over a path which includes AND gate 1116, and the remainder of the above enumerated path starting with OR gate 1010. If a trunk information location in the line and trunk information store 802 is to be updated, the trunk number is transmitted to the register 805 over a path which includes cable 712, AND gate 1114, and again, the remainder of the path starting with OR gate 1010. The line and trunk information store 802 is updated at the above-noted locations to reflect the new time slot assignment. That is, after an idle pair of time slots have been found, the address of the first time slot of the idle pair of time slots is transmitted from the translator 912 via cable 913, cable 849, OR gate 850, AND gate 827, and cable 809 to the time slot portion of the register 800. Subsequently, the information in the register 800 is transferred back to the line and trunk information store 802 at the appropriate information location. As previously noted, time slot numbers comprise a two piece 6-bit binary code wherein 5-bits of the code define the number of the time slot position within a link timing cycle and the sixth bit defines the link to which the time slot is assigned. Accordingly, when the attention of the idle-hunt selector and make-busy circuit is directed to time slots, an action translator signal on the TS conductor serves to modify the rule of action of the translator 912 to provide a time slot address code in the appropriate form as set forth above.

(5) Generate a data message to be transmitted from the control unit to the switching unit. The data message will comprise the number of the first time slot of the idle pair of time slots which have been assigned to the conference call, the line "A" number which is the original party to the connection, and the line "B" trunk or attendant's number depending upon the parties to the original connection as indicated by the call progress mark, and a single bit conference mark which is derived from the progress mark and which is inserted in the message by the action translator.

(6) The progress mark is updated to indicate that a conference call has been requested, that a pair of idle time slots have been found, and the parties indicated in the register are interconnected.

(7) The information in the call status store register 701 is read into the call status store 700 at the previously noted address of the first time slot of the idle pair of time slots.

(8) The call status store is addressed at the location of the second time slot of the idle pair of time slots. The address of the second time slot of the idle pair of time slots is obtained from the output of the translator 912 whose rule of action was altered by an action translator signal on conductor 940 to change the address from the first of the idle pair to the second of the idle pair. That is, the action translator signal on conductor 940 serves to change the sixth bit from a 0 to a 1 and thus provide the appropriate address on cable 913. This address is transmitted from cable 913 via OR gate 818, cable 617, AND gate 604, OR gate 603, and cable 601 to the call status store address translator 600. The switch number address is obtained from switch unit number counter 703 and is transmitted to the address translator 600 over cable 702. The information registered in the signaling receiver 501 is transmitted through AND gate 505, OR gate 507, cable 508, AND gate 538 to translator 519 where a conversion is made from directory number to line equipment number. The output signals of the translator 519 are registered in the call status store register 701 in the line "B" location. The extension, the directory number of which was registered in the signal receiver, may be idle and available to accept the call or may be busy and served in another time slot. Accordingly, the control unit transmits the address at the line "B" location from the call status store register 701 through AND gate 1116, OR gate 1010, OR gate 1008, and cable 1009 to the line and trunk information store address register 805. The address translator 806 is enabled by an action translator signal on conductor 807 and thus the information relating to the called line is read from the line and trunk information store 802 to the register 800. The service state of the called line is transmitted to the progress mark translator 1100 over cable 808. If the called extension is found to be busy and if there is no hunting address associated with the called extension, the conference call cannot be completed and a data message must be generated to transmit busy tone to the original parties to the call. If the called extension is one of a plurality of extensions of a hunting group, this will be indicated to the progress mark translator 1100 through the CL1 and CL2 class conductors. In this event, the action translator by means of a signal on conductor 831 will enable AND gate 832 to gate the hunted address from the register 800 via cable 833, OR gate 834, and cable 835 to the line "B" portion of the call status store register 701. An action translator signal on conductor 823 transfers the information relating to the originally called extension from the register 800 to the appropriate location within the line and trunk information store 802. Immediately thereafter the new address in the line "B" location of the call status store register 701 is transferred to the address register 805 and the information in the line and trunk information store 802 concerning the extension at the hunting address of the originally called line is transferred to the register 800. Again, if this extension is found to be busy, the hunt for an idle extension within the group may be continued until such time as the end-of-hunt detector 836 provides an output signal on the hunt-end conductor 811 which signifies to the progress mark translator 1100 that the call cannot be completed. In this event, busy tone is returned to the original parties to the connection. When busy tone is transmitted to the originally called parties after a request has been made for a conference call, the busy tone may be released by the requesting subscriber again flashing the switchhook, or if a switchhook flash is not forthcoming, the control unit after a short time-out interval in the order of a few seconds automatically removes busy tone from the circuit. That is, when it has been determined that the call cannot be completed, the control unit must update the progress mark at the time slot location assigned to the original parties to the connection to indicate that busy tone has been returned to a person who has requested a conference call and to initiate a timing cycle. The address of the first idle time slot of the pair of time slots is again obtained from the output conductors of the translator 912 and at this time the action translator signal on conductor 940 is removed and thus the address on cable 913 is that of the first of the two time slots of the idle pair of time slots.

A first data message is generated to order a connection in the first time slot in the idle pair of time slots between the requesting extension and the busy tone source and the second data message subsequently, after time out or after a switchhook flash by the requesting party, releases the busy tone connection and re-establishes the original connection between the requesting extension and the other party to the connection.

This procedure is followed only in the case of a conference call and in a terminating or intra-PBX call, busy tone is not removed until after the calling trunk or extension has hung up. Further, if the call cannot be completed, the second time slot of the pair of time slots must be released. Therefore, the supplementary information store is addressed to read time slot information to the register 902 and the make-idle translator 920 is directed to release the second time slot of the pair of time slots.

If the call can be completed either to the extension the number of which was registered in the signaling receiver or to another extension of a hunting group of extensions then the control unit will undertake the following additional steps:

(1) A progress mark is written in the call status store register 701 which indicates a conference call and indicates that this information relates to the second time slot of a conference call pair of time slots.

(2) A data message is assembled to be transmitted from the control unit to the switching unit. The data message comprises the number of the second time slot of the idle pair of time slots, the address of the added extension to the conference call which is obtained from the line "B" location, and a single bit conference mark which is derived from the progress mark and which is inserted in the data message by the action translator.

(3) After the data message has been assembled, the information in the call status store register 701 is read to the call status store 700 at the information location of the second time slot of the pair of time slots.

The conference gate 308 is enabled by simultaneous signals on conductors 412 and 413 from switch stores 403 and 404. After a conference call has been established, the parties to the conference may hang up in any desired order. That is, if the party at the extension added to the call hangs up first, the second time slot of the pair of time slots will be released and the conference gate will be disabled. If one of the original parties to the call hangs up first, the call may continue between the remaining original party and the party at the extension added to the call, that is, the first time slot of the pair of time slots is not released until both parties served therein have hung up and the second time slot of the pair of time slots is not released until the party at the extension served therein has hung up.

18. *Attendant call*

An intra-PBX call, i.e., a call between extensions of a switching unit or between an extension and the attendant's console, proceeds as outlined in the above described call for PBX extension 1 to a station served by the telephone central office up to and including the registration of call signaling information in the signal receiver. At that point, the processing by the control unit departs from the above description as there is no need to assign a trunk to the call but, rather, there is a need to first establish a ringing connection within the switching unit and then, subsequently, a talking connection. The following description relates to an intra-PBX call between PBX extension 1 and the attendant's console through the attendant's circuit 309.

As previously described, the scanner and last look memory 416 at the switch unit detects that PBX extension 1 has gone from the on-hook to the off-hook state and in response thereto assembles a data message to be sent from the switching unit to the control unit. This data message will be identical to the data message which was previously described with respect to the call to the central office 160 and merely indicates that PBX extension 1 is now in the off-hook state. Subsequent to receipt of this message in the data receiver 602, the control unit in the 0 time slot of switching No. 1 will recognize that a complete data message has been received and, as previously described, will undertake the following actions:

(1) Interrogate the line and trunk information store 802 at the address location of PBX extension 1 of switching unit No. 1 to determine whether or not PBX extension 1 is currently served by a time slot. In this example it is assumed that extension 1 is not served and that the data message relates to a service request.

(2) Locate and assign an idle time slot to the call.

(3) Locate and assign an idle signal receiver to the call.

(4) Locate and assign an idle signaling trunk to connect the assigned signal receiver to the switching unit.

(5) Formulate a data message to be transmitted from the control unit to switching unit No. 1 ordering a connection in the assigned time slot between the line circuit 303 of PBX extension 1 and a signaling trunk such as 119.

(6) Address the network control 511 to establish the connection through the network 509 between the signaling trunk 119 and the assigned signaling receiver, for example receiver 501.

(7) Write the appropriate call progress mark indicating that a signaling receiver has been assigned to a request for service in the call status store register 701 along with the binary address of the requesting line in the line "A" position of the register, the binary address of the signal receiver in the signal receiver portion and the binary address of the signaling trunk in the signaling trunk portion. The information in the register 701 is then transferred into the call status store to await the sequential service of the assigned time slot during subsequent cycles of the control unit.

19. *Evaluation of registered call signaling information*

During the subsequent sequential service of the assigned time slot, the control unit will note that the 1 conductor of cable 526 is energized indicating that one digit has been registered in the signal receiver and the output conductors 503 of the signal receiver 501 are gated through AND gate 505, OR gate 507, cable 508, and cable 527 to the input of the translator 904. As previously noted, the No. 1 translator 904 is assigned to the switching unit No. 1. In that the calling subscriber at PBX extension 1 has requested a connection to the attendant's console, the first digit registered is a 0 and in response to this registration the translator 904 will provide a signal on the ATT output conductor which is one of the input signals to the progress mark translator 1100. The progress mark translator at the time it receives the signal from the translator 904 on the ATT conductor is under the influence of a progress mark input signal which indicates that a calling subscriber has been attached to the signal receiver.

Before proceeding to a discussion of the actions which the control unit undertakes in response to the above input conditions it is necessary to have an understanding of the elements of the attendant's console 106, the attendant's circuits 133 and the manner in which these elements are controlled by and cooperate with the control unit. In this one illustrative embodiment each attendant's console is provided a line circuit, such as 131, which permits the association of the attendant's talking circuit with any of the time slots of the two transmission buses. The attendant's line circuits are controlled by information in the switch store, such as 403, after translation by the attendant number translator, such as 414. As previously explained, a three-way connection may be established between the extensions and a trunk by means of the conference gate 308 and, in that case, the time slots are required, i.e., one time slot of each of the two bus circuits. However, when the attendant is one party to a conversation, a three-way connection may be established without the use of the conference gate 308 and with only one time slot and one of the bus circuits. For example, it is possible to connect extension 1 to trunk 109 via the first bus circuit 301 under control of output signals from the line and trunk number translator 408 and to simultaneously in the same time slot connect the attendant's console 106 to the bus 301 under control of the attendant number translator 414.

Although an attendant, like any other telephone operator, can handle only one call at any given time, she must, however, have the ability to process a number of calls more or less simultaneously. For example, an attendant may answer a call from an incoming trunk; obtain the number of an extension to which the call is to be completed from the party at the distant end of the trunk; key the appropriate call signaling information to complete the call and then, while awaiting an answer, momentarily divert her attention from the call while answering a second call or giving further attention to another call. In this one illustrative embodiment each attendant's console is provided with four attendant loop circuits and certain console common circuits. The attendant's console of this embodiment employs what is known as switched loops and differs greatly from an attendant's switchboard. An attendant's loop is merely a means whereby the control unit and the attendant maintain a record of the progress of a call which has been handled or is being handled by the attendant. For example, in a switchboard each call served by the operator appears on a physical trunk circuit which is connected to the operator for purposes of transmission and control by means of a cord circuit or by means of a key circuit in the case of cordless switchboards. In the case of a cord type switchboard, the cord lamps are controlled directly by the supervisory condition of the extension or trunk to which they are connected and there is a talking key provided with each of the cord circuits for associating the operator's talk circuit with the desired cord circuit. Such is not the case in the present system. Each attendant's loop circuit has associated therewith for example a source lamp 1301, a destination lamp 1302, a pickup key 1304 and a pickup key lamp 1303. The source lamp is employed to indicate to the attendant whether the call which she is to handle has originated from an extension or from a trunk in addition to the normal idle and talking states, indications of which are obtained from normal operator cord lamps. The destination lamp, in addition to the idle and talking indications, also provides discrete signals which indicate to the attendant that the called party is being rung or that the called station is busy.

In addition to the dark and steady illuminated states the loop lamps are energized with 60 i.p.m. and 120 i.p.m. current to give the above-noted discrete indications to the attendant. The following table sets forth the various states of the lamps and the significance of these states.

SOURCE LAMP (1301)

| State of illumination: | Significance |
|---|---|
| Dark | Idle |
| Steady | Answered |
| 60 i.p.m. | Extension |
| 120 i.p.m. | Trunk |

DESTINATION LAMP (1302)

| State of illumination: | Significance |
|---|---|
| Dark | Idle |
| Steady | Answered |
| 60 i.p.m. | Busy |
| 120 i.p.m. | Ringing |

PICKUP KEY LAMP (1304)

| State of illumination: | Significance |
|---|---|
| Dark | Idle |
| Steady | Answered |
| 60 i.p.m. | Hold |

Each lamp has associated therewith bistable devices such as 1305 through 1310 which are set and reset in accordance with data messages received from the control unit. The lamp control portion of the data message is transmitted directly from the data distributors 405 and 406 to the attendant's circuit 133 wherein a combining translator 1311 provides output signals to set and reset the bistable devices which serve to control the illumination of the lamps. The lamp control information comprises five 2-bit words which are as follows:

Console Number
Loop Number
Source Lamp
Destination Lamp
Pickup Lamp

The pickup key is employed to associate the attendant's transmission circuit and common key equipment with a particular attendant's loop. The attendant's pickup key lamp in accordance with its light, dark or flashing state will indicate whether the loop is idle, answered, or held for future attention.

The operation of keys at the attendant's console merely serves to change the supervisory condition of the key scan points such as 135 and 136 which are associated individually with the keys and the keys do not directly control either the lamps or the line circuit. The key scan points 140 are scanned on a regular basis along with the scan points of the lines and trunks and changes in key scan point state are transmitted to the control unit in the same manner as changes in supervisory state of lines and trunks.

Information as to the availability of attendant loop circuits is maintained at the control unit in the supplementary information store 900 in the information row associated with the trunks of a switching unit, that is, there are twelve information locations in each trunk row which indicate the service states of the twelve possible attendant loop circuits. A record of the time slots in which a loop is served is maintained in the line and trunk information store 802 in separate rows which are individually assigned to the twelve possible loops. The class of service information on the CL1 and CL2 leads indicates to the progress mark translator that the information under consideration relates to a loop pickup key.

The common keys at the switchboard, namely, the hold key 1321, the flash key 1322, and the start key 1323 are selectively associated with the attendant loop circuits by depressing one of the common keys and then subsequently depressing a loop pickup key such as 1304. The information as to the particular common key depressed is transmitted from the switch unit to the control unit as 2-bits of the 13-bit data word and appears in coded form on the data receiver output conductors 1040 and 1041. These conductors are two of the input signals to the progress mark translator 1100.

With this general understanding of the operation of the attendant's console we may now return to a discussion of the actions which the control unit takes in response to the priorly set forth progress mark translator input signals, namely, a progress mark input signal which indicates that a calling subscriber has been attached to the signal receiver and an output signal of the translator 904 on the ATT conductor. The control unit takes the following action:

(1) Addresses the supplementary information store address translator 901 to the trunk information location assigned to switching unit No. 1. The service states of the transmission trunks, the signaling trunks, and the attendant loops of switching unit No. 1 are thus transferred from the supplementary information store 900 to the register 902. The idle-hunt selector and make-busy circuit 903 under the influence of an action translator signal on the T conductor 914 and of an attendant's signal on the ATT conductor of cable 918 from the translator 904 will hunt for an idle attendant's loop and will seize the first idle loop by updating the register 902 to show the seizure. Subsequently, the information in the register 902 is read to the supplementary information store 900 for future reference. Having found an idle attendant's loop the idle-hunt selector and make-busy circuit 903 will provide a signal representative of the seized loop to the binary translator 912 and thus transmit via cable a 4-bit binary address representative of the seized attendant's loop.

As priorly noted, the attendant loop circuits are assigned scanning point addresses 244 through 255 within the line and trunk information store 802. Information as to the availability of the attendant loops is found in the supplementary information store trunk rows at information locations 52 through 63. This assignment of scan point addresses and supplementary information store address locations provides a convenient consistent numbering plan. The following table sets forth the binary addresses associated with each of the elements of the system and it is readily seen therefrom the manner in which information signals are derived.

| Binary Bit | 1 | 2 | 3 | 4 | 5 | 6 | 7 | 8 |
|---|---|---|---|---|---|---|---|---|
| Bit Significance | 1 | 2 | 4 | 8 | 16 | 32 | 64 | 128 |
| Extensions: | | | | | | | | |
| 1 | 1 | 0 | 0 | 0 | 0 | 0 | 0 | 0 |
| 200 | 0 | 0 | 0 | 1 | 0 | 0 | 1 | 1 |
| Transmission Trunks: | | | | | | | | |
| 201 (9) | 1 | 0 | 0 | 1 | 0 | 0 | 1 | 1 |
| 235 (43) | 1 | 1 | 0 | 1 | 0 | 1 | 1 | 1 |
| Signaling Trunks: | | | | | | | | |
| 236 (44) | 0 | 0 | 1 | 1 | 0 | 1 | 1 | 1 |
| 241 (49) | 1 | 0 | 0 | 0 | 1 | 1 | 1 | 1 |
| Tones: | | | | | | | | |
| 242 (reorder) | 0 | 1 | 0 | 0 | 1 | 1 | 1 | 1 |
| 243 (busy) | 1 | 1 | 0 | 0 | 1 | 1 | 1 | 1 |
| Attendant Loops: | | | | | | | | |
| 244 (52) | 0 | 0 | 1 | 0 | 1 | 1 | 1 | 1 |
| 245 (53) | 1 | 0 | 1 | 0 | 1 | 1 | 1 | 1 |
| 246 (54) | 0 | 1 | 1 | 0 | 1 | 1 | 1 | 1 |
| 247 (55) | 1 | 1 | 1 | 0 | 1 | 1 | 1 | 1 |
| 248 (56) | 0 | 0 | 0 | 1 | 1 | 1 | 1 | 1 |
| 249 (57) | 1 | 0 | 0 | 1 | 1 | 1 | 1 | 1 |
| 250 (58) | 0 | 1 | 0 | 1 | 1 | 1 | 1 | 1 |
| 251 (59) | 1 | 1 | 0 | 1 | 1 | 1 | 1 | 1 |
| 252 (60) | 0 | 0 | 1 | 1 | 1 | 1 | 1 | 1 |
| 253 (61) | 1 | 0 | 1 | 1 | 1 | 1 | 1 | 1 |
| 254 (62) | 0 | 1 | 1 | 1 | 1 | 1 | 1 | 1 |
| 255 (63) | 1 | 1 | 1 | 1 | 1 | 1 | 1 | 1 |

The trunks, transmission trunks, signaling trunks, and attendant loops are assigned information locations 9 through 63 in the supplementary information store while signal receivers and time slots are assigned information locations starting with 1. As seen from the above table, the two most significant bits of the 8-bit address associated with transmission and signaling trunks are always 1. Therefore, a 6-bit address on cable 913 is sufficient to fully identify a transmission or signaling trunk. Similarly, the four most significant bits of an 8-bit number which fully defines an attendant's loop are always in the 1 state; therefore, the four least significant bits are sufficient to fully define an attendant's loop. The loops are assigned in groups of four to the attendant consoles and the third and fourth least significant bits, that is, the bits with the binary weights of 4 and 8, respectively, are employed to define the console and the first and second bits, i.e., the bits with the binary weights of 1 and 2 are employed to define the loop within the console. In the above table the 8-bit numbers which are assigned to extensions, trunks, and loops are shown at the left of the table, and in the case of trunks and attendant loops the information location assignments within the supplementary information store are shown in parentheses to the right thereof.

As previously explained, the attendant's portion of a call status word comprises 4-bits which are arranged in two 2-bit words. The first 2-bits define the loop number and the second 2-bits the console number. Accordingly, the signals on the first four conductors, i.e., 1, 2, 4 and 8 of cable 913 are gated through AND gate 824 under control of an action translator signal on conductor 826 to conductor group 825, OR gate 724 and thus to the attendant portion of the call status store register 701.

The assignment of the idle attendant's loop is also noted in the line and trunk information store 802 to permit the control unit to interpret subsequent data messages relating to changes in state of the loop pickup key. The line and trunk information store address translator 806 is addressed with the switch unit number over cable 706 and with the attendant loop address over a path which includes cable 725, AND gate 1123, cable 1124, OR gate 1020, OR gate 1008 and cable 1009. In that only the four least significant bits of the address are available from the attendant's portion of the call status store register 701, the four more significant bits all specified to be 1's are inserted by the action translator over a path which includes cable 1020, OR gate 1010, OR gate 1008 and cable 1009. The information relating to the seized attendant's loop is thus read from the line and trunk information store 802 to the register 800 and action translator signal on conductor 828 gates the time slot number from cable 921 through AND gate 827 and cable 809 to the time slot portion of the register 800. The time slot number is supplied from the time slot geserator 605 over a path which includes cable 606, cable 620 and AND gate 1022. The service portion of the register 800 is updated to show the assignment of the loop by an action translator signal over conductor 810.

After it has been determined that the subscriber at extension 1 of switching unit No. 1 has requested a connection to the attendant's console and an attendant's loop has been assigned to the request, the control unit may release the time division connection in the switching unit between extension 1 and the previously assigned signaling trunk and the connection at the control unit between the signaling trunk and the signal receiver. The connection at the switching unit between extension 1 and the signaling trunk will be destroyed when a data message is transmitted from the control unit to order the announcement of a call awaiting the attendant's attention on the assigned trunk. That is, the data message will comprise in addition to the start and parity bits:

(a) Time slot number.
(b) The switching unit address of extension 1.
(c) Unassigned switching unit address.
(d) A 2-bit word defining the number of the attendant's console in which the assigned loop appears.
(e) A 2-bit word defining the assigned loop.
(f) Lamp bits which order the connection of 60 i.p.m. to the source lamp of the assigned loop.

The connection at the control unit between the signaling trunk and the assigned signal receiver through switching network 509 is released, as previously described, by transmitting to the network control 511 the binary number representative of the signaling receiver to be released and a release signal from the action translator over conductor group 517. Also, the signal receiver and the signaling trunk which are released at this time are now available for other service. Therefore, the supplementary information store 900, as previously described, is updated through the make-idle translator 920 to show that the released signal receiver and the released signaling trunk are now idle. It should be noted that in connection with the earlier described call the signal receiver was employed in the call after the signaling trunk was released in that the signaling receiver awaited completion of outpulsing to the trunk; however, in the present example the destination of the call is fully known at this time and the signal receiver and the signaling trunk may both be released.

(2) The progress mark in the call status store register 701 is updated to indicate that an alerting signal has been transmitted to the attendant's console to flash the source lamp of the loop assigned to the call.

The call to the attendant awaits an answer by the attendant. The attendant answers the call by depressing the pickup key such as 1304 of the loop assigned thereto. The pickup key is a nonlocking key which causes a change in potential at the key point which is associated therewith. A key point is like a scan point of an extension or a trunk. That is, the potential at a key point, like a scan point, indicates whether a key is depressed or not depressed and these two states correspond to off-hook and on-hook in the case of an extension. Extension and trunk scan points and key points are scanned at sufficiently frequent times to assure that the depression of a pickup key will be noted and a data message relating thereto will be formulated and transmitted to the control unit. The data message will comprise a start bit, the 8-bit address which is associated with the loop, a supervisory bit which indicates that the key point is in the depressed state, and a parity bit. The remaining two bits, i.e., the key bits, are both in the 0 state in the subject message as these bits relate only to the state of the console common keys. The data message is received at the control unit and, like all other data messages, is served in the ensuing 0 time slot of switching unit No. 1. The address contained therein is employed to address the line and trunk information store 802 to the information location assigned to the associated loop. That is, the address which is received in the data receiver 602 is transmitted via AND gate 614, cable 615, OR gate 1003, cables 1005, 1006, 1007, OR gate 1008 and cable 1009 to the line and trunk information store address register 805 while the switch unit number is transmitted from the switch unit number generator 703 to the address translator 806 via cable 706. The address translator 806 is enabled by an action translator signal on conductor 807 and thus the information relating to the loop in question is transmitted from the line and trunk information store 802 to the register 800. The class of service leads CL1 and CL2 indicate to the progress mark translator 1100 that the message relates to a change in state of a loop key and the time slot in which the loop is served is read from the register 800 and transmitted via cable 801, OR gate 818, cable 617, AND gate 604 and OR gate 603 to the call status store address translator 600. The translator 600, in addition, is addressed with the switch unit number as obtained from the switch unit number generator 703. The call status store 700 is thus read at the information location of the time slot in which the loop is served, namely, the time slot which was obtained from the information register 800.

The control unit interprets the message to indicate an answer by the attendant and proceeds to (1) update the progress mark in the register 701 to reflect the answer by the attendant, and (2) to generate a data message to be transmitted from the control unit to the switching unit to change the state of the source lamp from flashing at the 60 i.p.m. rate to the steady state and to cause the pickup key lamp to be illuminated steadily. Further, the data message includes the console number and loop number which is required not only in the control of the lamps but also is required to enable the attendant's line circuit such as 131 in the required time slot.

The call between the calling extension and the attendant may now proceed and the control unit will await an indication of further action either by the calling extension or the attendant. If the extension called the attendant merely to obtain information, the next expected action would be a request for release of the call either by the extension or the attendant. However, if the party at the extension has asked the attendant to complete a call to another extension of the switchboard, to verify whether an exension is busy or idle or to complete a call either to another PBX or to a distant subscriber via a trunk, the next action noted by the control unit will originate with the attendant. The attendant may wish to hold the call in which case she depresses the common hold key 1321 and then depresses the pickup key such as 1304 of the loop to be held. This action is noted by the scanner and last look memory circuits and the key common circuits. As previously noted, the pickup key 1304 is a nonlocking key which is momentarily depressed to answer a call. The scanning and last look memory circuit detects the transition of the key from the nondepressed or on-hook state to the depressed or off-hook state and a data message is transmitted from the switching unit to the control unit to reflect this transition. In the scanning of lines and trunks the transition from both on-hook to off-hook and off-hook to on-hook is noted and separate data messages are transmitted from the switch unit to the control unit. However, in the case of the scanning of keys the transition from the depressed state to the nondepressed state, i.e., from off-hook to on-hook are ignored and only one data message is transmitted in response to the depression of a key at the console. When the hold key and subsequently the loop pickup key are operated a new data message to be transmitted from the switching unit to the control unit will be formulated. In addition to the start bit the message will comprise the 8-bit address of the loop which is to be held, a 2-bit key word representing the hold key, the supervisory bit which indicates that the pickup key 1304 is depressed and the parity bit. This data message, like all other data messages, is first employed in the control unit to address the line and trunk information store 802 to determine whether or not the loop whose address is included in the data message is served and, if served, to obtain the number of the time slot in which the loop is served to address the call status store to the appropriate information location. The two key bits which appear at the output of the data receiver 602 on conductors 1040 and 1041 appear as input signals to the progress mark translator 1100 and, in accordance with the coding of these leads, the progress mark translator will order the action translator to accomplish the appropriate results. That is, when a loop is to be held, the control unit will formulate a data message to be transmitted to the switching unit and this message will serve to cause the pickup key lamp to change from a steady state to a state of flashing at a 60 i.p.m. rate and will release the connection between the attendant's talking circuit and the transmission bus. The flashing pickup key lamp reminds the attendant that there is further action required and she may now proceed to serve calls on other loops. Subsequently, the attendant may return her attention to the loop which she has previously ordered to be held and she is again connected to the talking bus in the time slot in which the held loop is served and the attendant may then take steps to further the progress of the call. For example, the attendant may have held the call while looking for information and then returned her attention to the call with a view towards establishing a connection between the calling extension and a station served by the distant central office. For example, if the subscriber who called the attendant wishes to place a personal call which is to be billed to him directly rather than to his employer, he may ask the attendant to complete the call or it is possible that the class of service of the extension from which the call is placed is such that a long distance call cannot be originated therefrom. In either event, calls to distant offices must be completed though the attendant.

The attendant requests dial tone by momentarily depressing the nonlocking start key 1323 and then the loop pickup key and this action is noted by the scanner and last look memory circuit at the switching unit. A data message is transmitted from the switching unit to the control unit and this message includes the address of the loop on which the call is being handled and the 2-bit key word which indicates depression of the common start key.

This data message again is employed to address the line and trunk information store 802 to determine whether or not the loop is currently served and subsequently, having found that the loop is served, the call progress mark translator will interpret the message to be a request by the attendant for an idle signaling trunk and an idle signaling receiver. The control unit then, as previously outlined with regard to both an outgoing call and a tranfser call, will undertake steps to find an idle signaling receiver and an idle trunk and to formulate both local messages and data messages to effect a connection between the calling extension, the attendant's console, and the assigned signaling receiver. After a signaling receiver has been attached to the trunk and the trunk connected via the time division bus at the switching unit to the calling extension, dial tone will be returned to the attendant who may now proceed to outpulse the directory number of the called station. This call proceeds in the same manner as an outgoing call. After the connection has been established and the called party at the distant office has answered, the loop at the console will be released as no further action of the attendant is required.

In addition to the common hold and start keys 1321 and 1323 the attendant is also provided a flash key 1322. The flash key is employed in the handling of trunk calls and, specifically, when the attendant depresses the flash key, the control unit will proceed to transmit a supervisory flash over the trunk circuit to the distant office. The flash key 1322, like the hold key and start key, is depressed immediately prior to the depression of a loop pickup key. This action of the attendant is again detected by the scanner and last look memory circuits and a data message is transmitted from the switching unit to the control unit where it is detected, interpreted, and acted upon.

20. *Incoming call (direct inward dialed)*

As previously noted herein, there are scan points associated with each of the incoming trunks to a switching unit and an incoming call on one of these trunks is first detected by the scanner and last look memory circuit 416 or 417 at the switching unit. As in the case of a call which originates from an extension, a data message will be formulated and transmitted from the switching unit to the control unit where the message will be employed to address the line and trunk information store. On a call origination the trunk, the number of which was noted in the data message, will be indicated to be in the idle service state and there will not be a time slot number associated therewith. Accordingly, the control unit, (1) Will locate an idle time slot and assign that time slot to the call.

(2) Will locate and assign an idle signaling trunk and an idle signal receiver to the call.

(3) Will generate a data message to be transmitted to the switching unit to establish a time division connection between the incoming trunk and the assigned signaling trunk.

(4) Will update the call status store to reflect the above assignments.

Thereafter dial tone is returned to the distant end of the incoming trunk and call signaling information is forwarded from the trunk to the assigned signal receiver. The call proceeds thereafter in the same manner as a call which originates from an extension. That is, the call signaling information is evaluated, the control unit determines whether or not the call can be completed and if it cannot be completed, returns reorder or busy tone to the distant end of the trunk, or if the call can be completed, transmits ringing tone to the extension if the call is to an extension or transmits an alerting signal to an attendant if an attendant call is indicated. After the called extension or the attendant answers, the trunk seize and make-idle circuit is addressed to the incoming trunk to transmit off-hook, i.e., answer supervision to the distant end of the trunk.

An incoming trunk call is subsequently scanned to detect a request for additional service or a hang up and such a call continues until such a request is originated.

The above description is but illustrative of the principles of this invention and many variations thereof may be devised by one skilled in the art without departing from the spirit and scope of the invention. For example, the attendant's functions may be expanded to provide the attendant with a number of other common keys such as split forward key, a split back key, a release forward key, a release back key, a busy verify key, et cetera. Further, the numbering scheme employed herein may be expanded or modified to serve additional transmission trunks, additional attendant loops, and a variety of maintenance facilities. Similarly, the organization of information in the various memories is but illustrative of the principles of this invention and such information may be readily reorganized in a number of other groupings.

What is claimed is:

1. A telephone switching system comprising a telephone central office, a plurality of private branch exchanges, a control unit common to said plurality of private branch exchanges, a switching network at each of said private branch exchanges, a plurality of extensions terminating on each of said networks, a plurality of trunks terminating on each of said networks, independent scanning and memory means at each of said private branch exchanges for maintaining records of the supervisory states of said extensions and said trunks, data communication means interconnecting said private branch exchanges and said control unit for transmitting information between said private branch exchanges and said control unit, memory means in said control unit for maintaining a system status record and means in said control unit for generating and transmitting control information over said data communication means to control said switching network.

2. A telephone switching system comprising a telephone central office, a plurality of private branch exchanges, a control unit common to said plurality of private branch exchanges, a plurality of extensions at each of said private branch exchanges, a plurality of trunks interconnecting said private branch exchanges and said telephone central office, a switching network at each of said private branch exchanges for selectively interconnecting said extensions and said trunks, scanning and memory means at each of said private branch exchanges for maintaining records of the supervisory states of said extensions and said trunks, data communication means interconnecting said private branch exchanges and said control unit for transmitting supervisory messages to said control unit and for transmitting control indicia to said private branch exchanges, memory means in said control unit for maintaining a system status record, means for reading said system status record from said second memory means and means in said control unit responsive to said reading means and said supervisory information for generating said control indicia.

3. A telephone switching system in accordance with claim 2 wherein said switching network comprises a time division switching network.

4. A telephone switching system in accordance with claim 3 wherein said time division switching network comprises a plurality of time division links, gating means for selectively connecting said lines and said trunks directly to all of said links and gating means for selectively interconnecting said links.

5. A telephone switching system in accordance with claim 4 wherein each of said private branch exchanges further comprises a switch control memory means responsive to control indicia received over said data communication means for selectively controlling said gating means to selectively interconnect said lines and said trunks.

6. A telephone switching system in accordance with claim 2 wherein certain of said trunks interconnecting said private branch exchanges and said telephone central office are call signaling trunks and said common control unit further comprises call signaling register means selectively connectable to said call signaling trunks and wherein said control unit generates control indicia for selectively connecting said extensions to said register means by way of said switching network and said call signaling trunks.

7. A telephone switching system comprising a plurality of suboffices and a control unit common to said plurality of said suboffices for maintaining records of calls through said suboffices and for controlling connections through said suboffices; each of said suboffices comprising a time division switching network, a plurality of voice frequency lines terminating on said network, a plurality of voice frequency trunks terminating on said network, scanning and memory means for maintaining a record of the supervisory states of said lines and trunks and for detecting changes in supervisory states of said lines and trunks, and a temporary memory for maintaining a record of the connections established in said switching network.

8. A suboffice of a telephone switching system comprising a plurality of time division links, a plurality of extensions, a plurality of trunks, a plurality of line and trunk circuits connecting said extensions and said trunks directly to said plurality of links, suboffice control means comprising memory means for storing indica representative of said extensions and said trunks to be interconnected, means for cyclically reading said indicia from said memory means and means including said line and said trunk circuits responsive to said reading means for selectively interconnecting said extensions and said trunk circuits.

9. A suboffice of a telephone switching system controlled by and responsive to a control unit which is common to a plurality of said suboffices comprising data receiving means, data transmitting means, a time division switching network comprising a plurality of time division links, a plurality of lines served by said suboffice, a plurality of trunks serving said suboffice, a plurality of line circuits and trunk circuits for connecting said lines and said trunks directly to said plurality of links, suboffice control means comprising a switch store responsive to output signals of said data receiving means for maintaining a record of connections established through said switching network, and a line and trunk number translator responsive to output signals of said switch store for selectively enabling said line circuits and said trunk circuits.

10. A telephone switching system comprising a main office and a plurality of suboffices responsive to control signals from said main office, said suboffices each comprising a plurality of extensions, a plurality of trunks, a plurality of time division multiplex communication links and gating means responsive to control signals from said main office for selectively connecting said extensions and said trunks directly to said plurality of time division multiplex links.

11. A telephone switching system comprising a main office and a plurality of suboffices responsive to control signals from said main office, said suboffices each comprising a plurality of communication paths, a plurality of time division multiplex communication links, gating means individually associated with said communication paths and responsive to control signals from said main office for selectively connecting said communication paths directly to said time division multiplex communication links and conference gate means responsive to other control signals form said main office for selectively connecting a pair of said plurality of time division multiplex communication links.

12. A telephone switching system comprising a main office and a plurality of suboffices responsive to control signals from said main office, said suboffices each comprising a plurality of communication paths and an attendant's console, a plurality of time division multiplex communication links, gating means individually associated with said communication paths responsive to control signals from said main office for selectively connecting said communication paths to said time division multiplex communication links and gating means associated with said attendant's console responsive to other control signals from said main office for selectively connecting said attendant's console to said time division multiplex communication links.

13. A telephone switching system comprising a main office and a plurality of suboffices, each of said suboffices comprising a time and space division switching network, a plurality of extensions, a plurality of transmission trunks, a plurality of signaling trunks, a plurality of tone sources and gating means individually associated with each of said extensions, trunks and tone sources for selectively connecting said extensions, trunks and tone sources directly to each of said plurality of time division multiplex communication links.

14. A telephone switching system comprising a main office and a plurality of private branch exchanges, each of said private branch exchanges comprising a switching network, a plurality of extensions terminating on each of said networks, a plurality of trunks terminating on each of said networks, scanning and memory means at each of said private branch exchanges for maintaining records of the supervisory states of said exchanges and said trunks, memory means at each of said private branch exchanges for maintaining a record of the connections established through said switching network, data communication means interconnecting said main office and each of said suboffices, means in said main office for generating data messages for the control of said switching networks and means in each of said private branch exchanges responsive to said data messages for inserting and erasing information in said memory means.

15. A telephone switching system in accordance with claim 14 wherein said switching network comprises a plurality of time division communication links and a plurality of gates responsive to information read from said memory means for selectively interconnecting said extensions and said trunks.

16. A telephone switching system comprising a telephone central office, a plurality of private branch exchanges, a control unit in said central office common to said plurality of private branch exchanges, a switching network at each of said private branch exchanges, a plurality of extensions terminating on each of said networks, a plurality of transmission trunks terminating on each of said networks for interconnecting said private branch exchanges and said telephone central office and a plurality of call signaling trunks terminating on each of said networks for transmitting call signaling information from said extensions and said transmission trunks to said control unit.

17. A telephone system comprising a plurality of PBX units, a single control unit common to all said PBX units, speech trunks, signaling trunks and a pair of data channels interconnecting each of said PBX units and said control unit, said PBX units each including a pair of time division buses, subscriber stations, tone sources, gate means connecting said stations, tone sources and trunks to both said time division buses, scanning means for detecting changes in state of said subscriber stations and said speech trunks, clock means determining the time cycle of said buses, means for transmitting the change of state information from said scanning means to said control means over one of said data channels at a rate less than said time cycle and means for receiving control information from said control unit over the other of said data channels for controlling the connection of said trunks, subscriber stations and tone sources to said buses in particular time slots of said time cycle.

18. A telephone system in accordance with claim 17 wherein said control unit includes data receiving means connected to said one data channel, means for counting the time slots of the time cycles of said PBX units, and means for operating on data in said data receiving means during a time period independent of said counting of said time slots, said time cycles of said PBX units being defined by said PBX unit clock means independent of the time slot counting means of said control unit.

19. A telephone system in accordance with claim 18 wherein said PBX units operate synchronously and wherein said control unit includes means for asynchronously advancing said counting means on completion of each operation in a particular time slot count.

20. A telephone system in accordance with claim 17 further comprising means for transmitting means for transmitting only call signaling information from said PBX units to said control unit over said signaling trunks.

21. A telephone system comprising a plurality of PBX units, a single control unit common to all said PBX units, speech and signaling trunks and data channel means interconnecting said PBX units and said control unit, time division bus means in each of said PBX units, subscriber stations, gating means in each PBX unit for connecting said subscriber stations through said time division bus to said speech and signaling trunks, scanning means including memory means at each PBX unit for detecting change of state conditions at said PBX units, means for transmitting change of state information from said scanning means over said data channel means to said control unit, means at said control unit responsive to information over said data channel means for connecting a signal receiver to one of said signaling trunks and for transmitting back over said data channel means information for causing said gating means to connect a calling subscriber station through said time division bus means to said one signaling trunk, and means at said control unit responsive to completion of signaling for transmitting back to said PBX unit over said data channel means information for causing said gating means to disconnect said calling subscriber from said signaling trunk and to connect said calling subscriber through said time division bus means to one of said speech trunks.

22. A telephone system in accordance with claim 21 further comprising clock means at each of said PBX units for defining synchronous office cycles for each of said PBX units, each of said office cycles comprising a cycle of time slots; time slot counting means at said control unit; means for advancing said time slot counting means; means at said control unit responsive to said counting means for servicing subscribers in accordance with the time slots assigned thereto at said PBX units; and means responsive to completion of a specified count of said counting means for servicing information at said control unit from said data channel means.

23. A telephone system comprising a plurality of private branch switching units each including a pulse amplitude modulation time division switching network, a single control unit for all said switching units and three distinct transmission facilities connecting said switching units to said control unit, said transmission facilities including speech trunks, signaling trunks for transmitting call signaling information and data channels including a first unidirectional data channel for transmitting supervisory information from each switching unit to said control unit and a second unidirectional data channel for transmitting control data from said control unit to each switching unit.

24. A telephone system in accordance with claim 23 wherein said switching units each include scanning means, memory means and means responsive to said control data for establishing and disestablishing connections through said time division switching network to said speech and signaling trunks, and wherein said control unit includes memory means for storing information with respect to the status of all calls through said switching units.

25. A telephone system in accordance with claim 23 wherein said control unit further comprises data receiver means connected to said first data channels and means responsive to said control unit memory means and information from said data receiver means for up-dating said control unit memory means.

26. A telephone system comprising a control unit, a PBX switching unit remote from said control unit, a plurality of trunks and data channels interconnecting said switching and control units, a pair of time division buses at said PBX unit, clock means for determining distinct time slots in a repetitive office cycle for said buses, subscriber stations, an attendant's console, means for connecting a pair of said subscriber stations together in a single one of said time slots, conference circuit means for connecting a third one of said subscriber stations to said pair in a second one of said time slots, and means for connecting said attendant's console to said pair of subscribers in said single time slot.

27. A telephone system in accordance with claim 26 wherein said switch unit further comprises storage means for maintaining a record of connections to be established in said time slots, scanner and memory means for detecting changes of condition in said switching unit, translator means, and data receive and send means for transmitting to said control unit over said data channels information as to said changes in condition and receiving from said control unit over said data channels control order information.

28. A telephone system in accordance with claim 27 wherein said translator means includes a subscribers station, a trunk number translator and an attendant's console number translator, said means for connecting said pair of subscriber stations together includes said subscriber station and trunk number translator, and said means for connecting said attendant's console to said subscribers includes said attendant's console number translator.

29. A telephone system in accordance with claim 26 wherein said conference means includes a conference circuit, means for connecting said conference circuit to one of said time division buses in said single time slot and means for connecting said conference circuit to the other of said time division buses in said second time slot.

30. A telephone system comprising a control unit, a plurality of PBX switching units, and a plurality of trunks and data channels interconnecting said switching units and said control units; each of said switching units including a plurality of extensions, a pair of time division links, scanning and memory means for maintaining a record of the supervisory state of all extensions and trunks, and data transmission means for transmitting supervisory information over said data channels to said control unit only after a change in supervisory state has occurred in said extensions and trunks at said switching unit.

31. A telephone system in accordance with claim 30 wherein said trunks between said switching units and said control unit include distinct speech and signaling trunks and means for connecting said extensions through said time division links to said signaling trunks for the transmission of call signaling information only to said control unit.

32. A telephone switching system comprising a plurality of PBX units, a single control unit common to all said PBX units and speech trunks, signaling trunks and a pair of data channels interconnecting each of said PBX units and said control unit, each of said PBX units including a time division multiplex link, a plurality of extensions, a plurality of tone sources, a plurality of gate means connecting said extensions, said tone sources and said trunks to said time division link, clock means for generating a plurality of time spaced clock pulses for defining time slots of a PBX timing cycle, means for receiving control information from said control unit over one of said data channels and responsive to said clock pulses for controlling the operation of said gate means for selectively connecting said trunks, said extensions and said tone sources to said link in particular time slots of said time cycle, scanning means for detecting changes in supervisory state of said extensions and said speech trunks, said scanning means including timing means independent of said clock means, and means for transmitting changes of supervisory state information from said scanning means to said control means over the other of said data channels, said rate of transmission being independent of said scanning rate and said clock pulses.

33. At telephone switching system comprising a control unit, a PBX unit remote from said control unit, a pair of time division buses at said PBX unit, clock means for determining distinct time slots in a repetitive office cycle for each of said buses, subscriber stations and attendant's console means, means for connecting a pair of said subscriber stations directly to one of said buses thereby connecting said pair of said subscriber stations together in a single time slot of said one of said buses and means including gating means for connecting said attendant's console directly to said one of said buses and thereby connecting said attendant's console to said pair of said subscriber stations in said one of said time slots.

34. A telephone switching system comprising a control unit, a PBX switch unit remote from said control unit, a pair of time division buses at said PBX unit, clock means defining distinct time slots in a repetitive office cycle for each of said buses, a plurality of subscriber stations, means for connecting a pair of said subscriber stations together in one of said time slots of one of said buses, means for connecting a third one of said subscriber stations to the other of said buses in a time slot corresponding to said one time slot of said one of said buses, and conference circuit means for directly connecting said first and said second buses during said one and said corresponding time slot.

35. A telephone switching system comprising a plurality of PBX units, a single control unit common to all said PBX units, said PBX units each including a time division communication link, a plurality of extensions, an attendant's console, said attendant's console including a line circuit for connecting said attendant's console to said time division link, said attendant's console further comprising a plurality of keys, a plurality of key scanning points individually associated with said keys, and each of said PBX units further comprising scanning means for detecting changes in supervisory state of said extensions, said trunks and said attendant's keys and means for generating and transmitting change of supervisory state information from said PBX unit to said control unit.

36. A telephone switching system in accordance with claim 35 further comprising speech trunks, signaling trunks and a pair of data channels interconnecting each of said PBX units and said control unit wherein said change of supervisory state information is transmitted from said PBX unit to said control unit via one of said pair of data channels.

37. A telephone switching system comprising a plurality of PBX units and a single control unit common to all said PBX units, each of said PBX units including an attendant's console comprising an attendant's talking set and a plurality of loop circuits, each of said loop circuits including a loop pickup key and a plurality of loop lamps, and each of said PBX's including attendant's circuits responsive to control information from said control unit for selectively energizing said lamps of said loop circuits.

38. A telephone switching system in accordance with claim 37 wherein said attendant's circuits comprise logic and memory means for controlling the energization of said loop lamps and translator means responsive to said information from said control unit for energizing said logic and memory means.

39. A telephone switching system in accordance with claim 37 wherein each of said loop circuits includes a source lamp, a destination lamp, a pickup lamp and a pickup key.

40. A telephone switching system in accordance with claim 37 wherein said logic and memory means comprise a pair of bistable devices, a plurality of current sources and gating means responsive to the states of said bistable devices for selectively connecting said plurality of current sources to said source lamp, said destination lamp, and said pickup lamp.

41. A telephone switching system comprising a plurality of PBX units and a single control unit common to said PBX units for controlling the establishment of connections through said PBX units, each of said PBX units including a time division switching network and clock means for defining a fixed number of time slots of a repetitive office cycle, said clock means in all of said PBX units operating at approximately the same time cycle but operating independently of each other, and a word-organized memory means in said control unit wherein blocks of words are assigned to each of said PBX units, the number of words in each of said blocks being equal to or less than said fixed number of time slots plus 1, said number of words assigned each of said switching units being one more than the number of time slots which may be utilized in the respective switching unit.

42. A telephone switching system comprising a plurality of PBX units and a control unit common to said PBX units for controlling the establishment of connections through such PBX units, each of said PBX units including a time division switching network and clock means for defining a first number of time slots of a repetitive office cycle, said clock means in said PBX units operating independently of each other, and a word-organized memory means in said control unit wherein individual blocks of words are assigned to each of said PBX units.

43. A telephone switching system in accordance with claim 42 wherein said clock means in each of said PBX units define the same number of time slots.

44. A telephone switching system in accordance with claim 42 wherein the number of words in said blocks of words of said word-organized memory are equal to or less than said fixed number of time slots plus at least 1 and wherein said number of words in each of said blocks of words is dependent upon the traffic handling requirements of said PBX units.

45. A telephone switching system comprising a plurality of PBX units and a single control unit common to said PBX units for controlling the establishment of connections through such PBX units, each of said PBX units including a switching network capable of handling a fixed number of simultaneous connections, and memory means in said control unit wherein blocks of words are assigned to each of said PBX units, said number of words in each of said blocks being independent of the number of words in blocks assigned other PBX units and being dependent only on the traffic handling requirements of said associated PBX unit.

References Cited by the Examiner

UNITED STATES PATENTS 3,049,593 8/1962 Touraton ------------ 179—15

ROBERT H. ROSE, *Primary Examiner.*

DAVID G. REDINBAUGH, *Examiner.*